(12) United States Patent
Moon

(10) Patent No.: US 7,904,104 B2
(45) Date of Patent: *Mar. 8, 2011

(54) CHANNEL COMMUNICATION APPARATUS AND METHOD IN CDMA COMMUNICATION SYSTEM

(75) Inventor: Hi-Chan Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 871 days.

This patent is subject to a terminal disclaimer.

(21) Appl. No.: 11/005,691

(22) Filed: Dec. 7, 2004

(65) Prior Publication Data

US 2005/0096077 A1 May 5, 2005

Related U.S. Application Data

(62) Division of application No. 09/368,129, filed on Aug. 4, 1999, now Pat. No. 7,653,040.

(30) Foreign Application Priority Data

| Aug. 4, 1998 | (KR) | 1998-031952 |
| Aug. 14, 1998 | (KR) | 1998-033359 |
| Sep. 3, 1998 | (KR) | 1998-036679 |

(51) Int. Cl.
*H04B 7/00* (2006.01)

(52) U.S. Cl. ............ 455/522; 455/69; 455/560; 370/342

(58) Field of Classification Search .................. 455/522, 455/561, 343.1, 434, 435.1, 435.2, 453; 370/311, 370/342, 441

See application file for complete search history.

(56) References Cited

U.S. PATENT DOCUMENTS

| 5,694,388 A | 12/1997 | Sawahashi et al. |
| 5,754,583 A | 5/1998 | Eberhardt et al. |
| 5,771,461 A * | 6/1998 | Love et al. ..................... 455/522 |
| 5,794,129 A | 8/1998 | Komatsu |
| 5,930,242 A | 7/1999 | Mimura |
| 5,970,414 A | 10/1999 | Bi et al. |
| 6,070,086 A * | 5/2000 | Dobrica ........................ 455/522 |
| 6,085,092 A | 7/2000 | Schmidt et al. |
| 6,137,788 A * | 10/2000 | Sawahashi et al. ........... 370/342 |
| 6,285,887 B1 * | 9/2001 | Mimura ........................ 455/522 |
| 6,466,561 B1 * | 10/2002 | Lee et al. ...................... 370/335 |
| 6,567,391 B1 * | 5/2003 | Moon ........................... 370/342 |
| 6,577,608 B1 * | 6/2003 | Moon et al. ................... 370/311 |
| 6,609,007 B1 * | 8/2003 | Eibling et al. ................ 455/522 |
| 6,744,754 B1 * | 6/2004 | Lee ............................... 370/342 |
| 6,898,193 B2 * | 5/2005 | Saifuddin ..................... 370/326 |
| 7,065,377 B2 * | 6/2006 | Kwon et al. ................... 455/522 |

(Continued)

FOREIGN PATENT DOCUMENTS

CA 2139259 12/1994

(Continued)

*Primary Examiner* — Sharad Rampuria
(74) *Attorney, Agent, or Firm* — The Farrell Law Firm, P.C.

(57) ABSTRACT

A channel communication apparatus and method are provided for a CDMA communication system method for acquiring signals from multiple adjacent base stations by a terminal; for providing more efficient set management; for providing more efficient multipath acquisition and finger assignment; and for acquiring a signal sent from an adjacent base station and a multipath signal which can reduce power consumption and hardware complexity in the terminal. The apparatus and methods also accurately measure the power or time delay of a signal received from a base station by a terminal in a CDMA communication system.

59 Claims, 32 Drawing Sheets

U.S. PATENT DOCUMENTS

| | | | |
|---|---|---|---|
| 7,567,781 B2 * | 7/2009 | Chen et al. | 455/69 |
| 7,570,967 B2 * | 8/2009 | Ronkainen | 455/522 |
| 7,587,217 B1 | 9/2009 | Laakso et al. | |
| 7,653,040 B1 * | 1/2010 | Moon | 370/342 |
| 7,684,819 B2 * | 3/2010 | Muraoka | 455/522 |
| 7,711,385 B2 * | 5/2010 | Ostman et al. | 455/522 |
| 2003/0045319 A1 * | 3/2003 | Sarkar et al. | 455/522 |
| 2004/0166886 A1 * | 8/2004 | Laroia et al. | 455/522 |
| 2005/0163068 A1 * | 7/2005 | Saifuddin | 370/326 |
| 2006/0068732 A1 * | 3/2006 | Jin | 455/232.1 |

FOREIGN PATENT DOCUMENTS

| | | |
|---|---|---|
| CA | 2 278 927 | 8/1998 |
| CN | 1165460 | 11/1997 |
| CN | 1201355 | 12/1998 |
| DE | 3933835 | 4/1991 |
| DE | 4039312 | 6/1992 |
| DE | 4141398 | 6/1993 |
| DE | 4225582 | 2/1994 |
| EP | 0 422 429 | 4/1991 |
| EP | 0 492 051 | 7/1992 |
| EP | 0 549 054 | 6/1993 |
| EP | 0817 400 | 7/1997 |
| EP | 0 795 969 | 9/1997 |
| GB | 2 311 446 | 9/1997 |
| JP | 9-036801 | 2/1997 |
| JP | 09-191276 | 7/1997 |
| JP | 11-284570 | 10/1999 |
| JP | 2001512632 | 8/2001 |
| JP | 2002514844 | 5/2002 |
| JP | 2002518927 | 6/2002 |
| RU | 1837403 | 8/1993 |
| RU | 1838881 | 8/1993 |
| WO | WO 92/21196 | 11/1992 |
| WO | WO 94/04005 | 2/1994 |
| WO | WO 97/08909 | 8/1995 |
| WO | WO 96/37969 | 11/1996 |
| WO | WO 98/34356 | 8/1998 |
| WO | WO 99/57849 | 11/1999 |
| WO | WO 99/66644 | 12/1999 |

* cited by examiner

CHANNEL COMMUNICATION APPARATUS AND METHOD IN CDMA COMMUNICATION SYSTEM

PRIORITY

This application is a Divisional Application of U.S. application Ser. No. 09/368,129 filed Aug. 4, 1999 now U.S. Pat. No. 7,653,040, which claims priority to applications entitled "Channel Communication Apparatus and Method in CDMA Communication System" filed in the Korean Intellectual Property Office on Aug. 4, 1998, Aug. 14, 1998 and Sep. 3, 1998 and assigned Serial Nos. 1998-31952, 1998-33359 and 36679, respectively, the contents of which are incorporated herein by reference.

BACKGROUND OF THE INVENTION

1. Field of the Invention

The present invention relates generally to cellular communication systems. More particularly, the present invention relates to a device and method in a CDMA (code division multiple access) communication system for performing channel acquisition, set maintenance, location positioning, multipath detection, delay estimation, channel status estimation, and finger assignment after detecting a specific channel on a forward link.

2. Description of the Related Art

FIG. 1 illustrates the various power levels associated with signals on a forward link transmitted by a base station in a conventional CDMA communication system (i.e., IS-95). The forward link is comprised of a pilot channel, a sync channel, a paging channel, a control channel and a traffic channel. The traffic channel is a dedicated channel, whereas the synch channel, the paging channel, and the control channel are common channels. Traffic signals are sent on traffic channels at different transmission power levels, and a sync signal and a pilot signal are sent on the synch channel and the pilot channel at constant transmission power levels. A terminal in this system acquires initial synchronization from the pilot channel received at the constant power level, and then performs finger assignment and set maintenance for handoff by measuring the reception level of the pilot channel. During the set management, the terminal can manage signal information generated from a plurality of base stations by continuously monitoring pilot signals received from a candidate set and a neighbor set as well as from an active set in communication with the terminal. Here, the terminal measures the reception level and delay or relative delay of multipath signal components received from the base stations. If the signal level of a pilot signal received from a base station in the active set drops to T_Drop or below during a call or the signal level of a pilot signal received from a base station in the neighbor set rises to T_Add or higher during a call, the terminal sends a pilot level measurement message to the base station. Upon reception of the message, the addressed base station considers that a handoff occurs and sends a handoff message to the terminal. Through a series of procedures, the terminal implements a handoff as it is travelling.

Windows are set for base stations and the terminal searches a corresponding window for each base station. As the bandwidth of a CDMA communication system becomes wider as in IMT (International Mobile telecommunication)-2000, the time resolution in a receiver becomes correspondingly narrower. Thus, the chip size of a window which the terminal should monitor becomes larger. Further, energy received from one path may be smaller than in an existing narrow-band system by the amount of increased time resolution. Further, if the rate of a pilot channel relative to all other transmission signals is to be reduced due to the wide band, a significant constraint is imposed on the mobile search. Therefore, as a consequence of the implementation of a wideband system, the power of the pilot channel cannot be reduced to or below a predetermined rate.

IMT-2000 supports a high data rate service as compared to the conventional mobile communication system. To accommodate rapid data transmission, a signal should be sent at a higher power level than a low data rate service like voice. Since transmission of a signal at a high power level may adversely affect the entire system capacity in a CDMA communication system, it is necessary to limit available services according to terminal location and channel status. This is performed through the conventional set management. However, the conventional set management has limitations because it is based on a low data rate service. To overcome the limitations associated with conventional set management, a way should be explored in which a terminal can acquire signals from more base stations and estimate the channel status faster and more accurately.

The FCC (Federal Communications Commission) of the United States provides that a terminal should be equipped with a device for informing a user's location within a radius of 125 m for 67% or more time in an emergency. If a terminal can acquire signals from a plurality of base stations during a set management, the signals can help detect the mobile's location. As signals are acquired from more base stations in a neighbor set, the location can be detected more accurately.

However, it is impossible for a terminal nearer to a base station to acquire a signal from another base station because a signal from the former is far stronger than that the latter. Even a terminal located within a handoff region has much difficulty acquiring signals from a plurality of base stations because the power of a pilot channel sent from each base station on a forward link is limited. FIG. 2 illustrates, by example, power measurements of pilot signals sent from a plurality of base stations. Even a terminal near a handoff region cannot distinguish a pilot signal from noise component because of insufficient transmission power of the pilot signal. In this case, a searcher in the terminal detects the pilot signal only if it despreads an input signal for a long time. To accurately and rapidly acquire the pilot signal, the terminal should be provided with a searcher with complex hardware.

In view of the foregoing, it is not easy to estimate the location of a terminal on a forward link. To overcome this problem, an IS-95 system estimates a terminal's location using a power-up function (PUF). To allow the location of a terminal in an emergency to be estimated, the terminal sends a signal on a reverse link at a high power level until a plurality of base stations receive the signal. FIG. 3 illustrates the mobile initiated signal. Upon receipt of a PUF command from a base station, the terminal raises its transmission power until a plurality of base stations can acquire its signal. The base station acquires the signal from the terminal and measures a round trip delay and signal level. Based on the measured information, the distance between the terminal and a corresponding base station can be estimated.

Upon receipt of a command requesting implementation of a PUF from the base station, the terminal sends the PUF using a preamble of a reverse traffic channel as shown in FIG. 3. The base station sets PUF performing positions, intervals between PUF pulses PUF-PERIOD, and other related parameters, and the terminal sends the PUF at the determined locations at a power level INC_PWR for the first pulse and then at a power level a specified amount PWR_STEP higher than the previous power level for a next pulse. The maximum number of pulses that the terminal can send is determined by a parameter TOTAL_PUF. The period of A single PUF is an integer multiple of 16 PCGs and divided into three segments the segments PUF_SETUP_SIZE and INC_PUF_SIZE are sent at a usual power level but the segment COMPLETE_FRAME is sent at a higher power level than usual.

To enable multiple base stations to receive a mobile signal, there are cases where the power of a reverse link should be increased from that for a call by 30-40 dB or higher. This may have a deadly influence on the performance and capacity of the reverse link. In addition, a mobile PUF is limited by a maximum mobile transmission power. The PUF scheme has limitations in its effectiveness of estimating a mobile location if a terminal is positioned where the distance between the terminal and base stations is large or the terminal runs out of battery life.

SUMMARY OF THE INVENTION

Therefore, an object of the present invention is to provide a method of acquiring signals from multiple adjacent base stations by a terminal in a CDMA communication system.

Another object of the present invention is to provide a more efficient set management method in a CDMA mobile communication system.

Still another object of the present invention is to provide a more efficient multipath acquisition and finger assignment method in a CDMA communication system.

Another object of the present invention is to provide a method of acquiring a signal sent from an adjacent base station and a multipath signal, which can reduce power consumption and hardware complexity in a terminal in a CDMA communication system.

A still further object of the present invention is to provide a method of accurately measuring the power or time delay of a signal received from a base station by a terminal in a CDMA communication system.

Yet still another object of the present invention is to provide a method of reducing the size and power consumption of a memory when a terminal stores an input signal for processing in a CDMA mobile communication system.

A further object of the present invention is to provide a method of increasing the entire system capacity by reducing a usual pilot power and increasing a pilot power for a short time in a CDMA communication system.

Another object of the present invention is to provide a method of estimating the location of a terminal via a forward link in a CDMA communication system.

To achieve the above objects, there is provided a signal transmitting method in a base station. A first signal on a common channel and a pilot signal on a pilot channel are sent at predetermined power levels, and the pilot signal is sent at a higher level than the predetermined level for a predetermined time period. A second signal on a dedicated channel is sent at a different level according to the number of subscribers.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
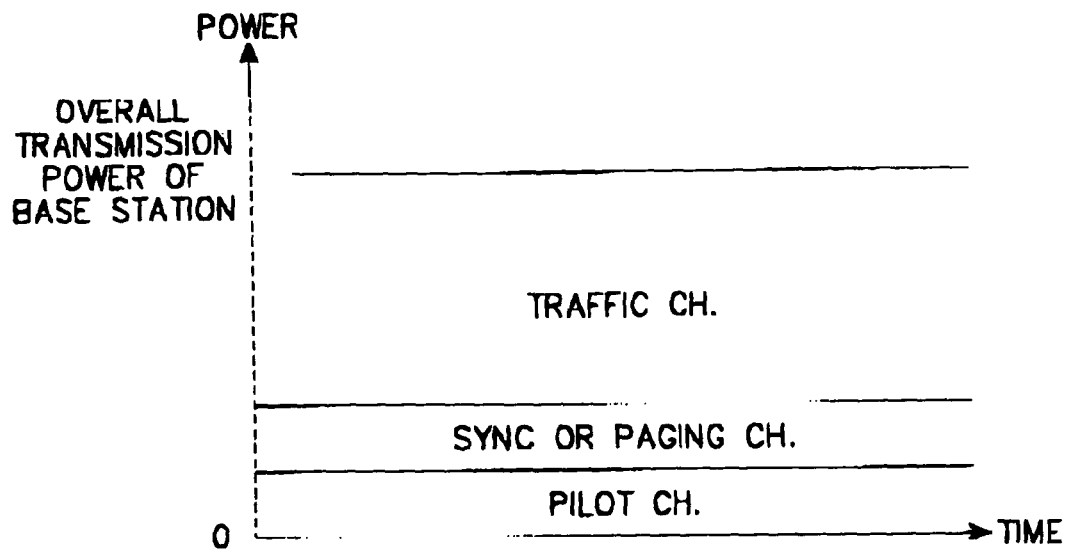
FIG. 1 illustrates the structure of a forward link directed from a base station to a mobile station in a conventional mobile communication system.
Figure 2:
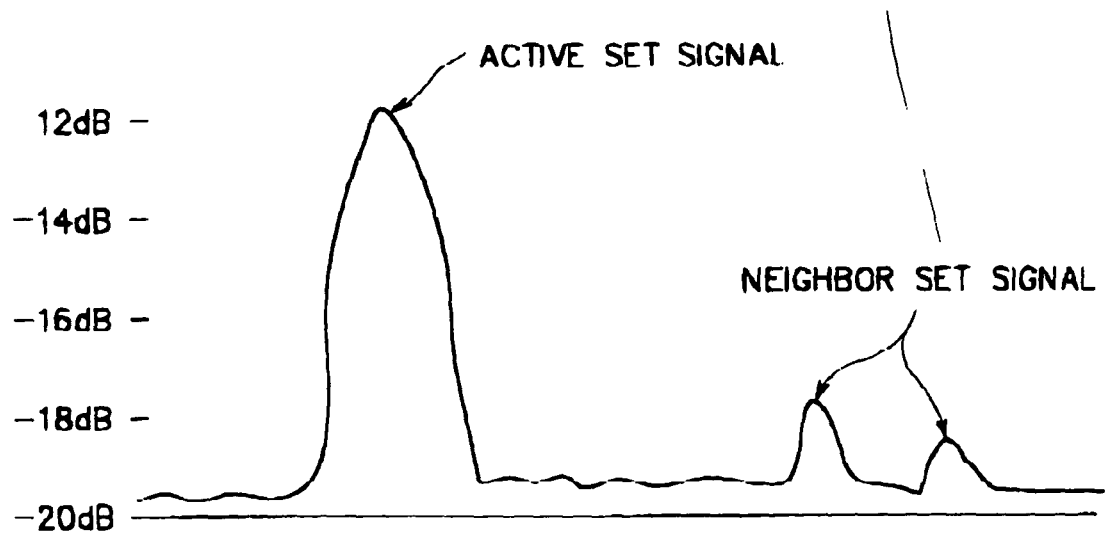
FIG. 2 illustrates measurements of signals received from an active set and a neighbor set by a conventional terminal.
Figure 3:
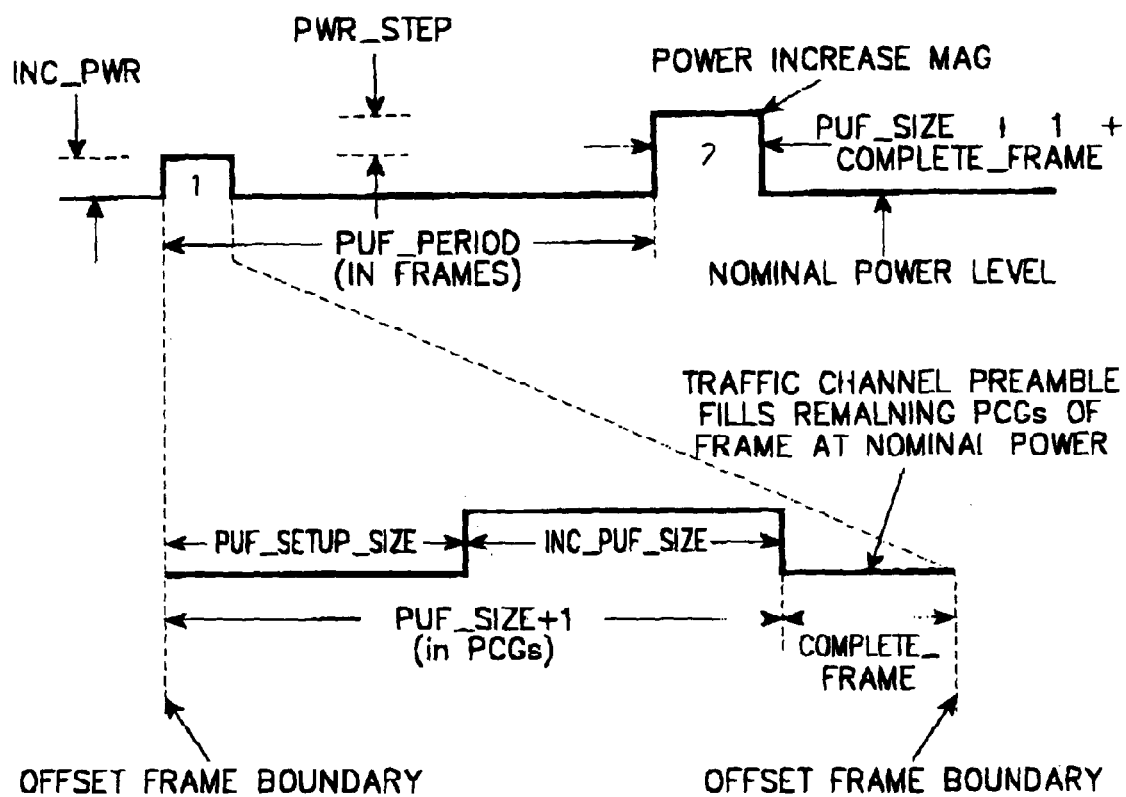
FIG. 3 illustrates mobile output when a conventional PUF is used.

Preferred embodiments of the present invention will be described in detail referring to the attached drawings. Like reference numerals denote the same components and it is to be noted that a detailed description of a known function or structure of the present invention will be omitted if it is deemed to obscure the subject matter of the present invention.

In accordance with an embodiment of the present invention, a base station sends a pilot signal on a forward pilot channel at an increased power level for a specified time period in order to allow efficient search in a terminal. The terminal despreads the received signal at the higher power level for a specified time period, detects signals from a plurality of base stations, and measures the signal level, delay, or delay relative to other paths of a multipath signal received from each base station.

It should be noted that the following description of the present invention refers to the other channels except for the pilot channel, that is the sync channel, the paging channel, the control channel, and the traffic channel as data channels. Also, data frames mentioned hereinbelow are included in a traffic signal on the traffic channel.

Figure 4A:
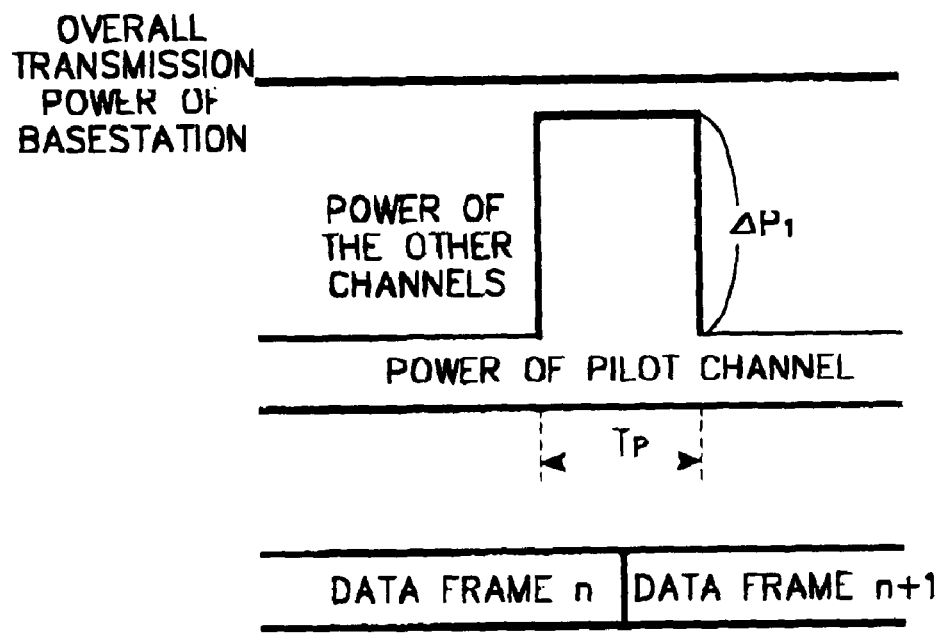
FIGS. 4A and 4B illustrate a forward link on which the power of a pilot channel is instantaneously raised so that a terminal can acquire signals from a plurality of base stations according to embodiments of the present invention.
Figure 4B:
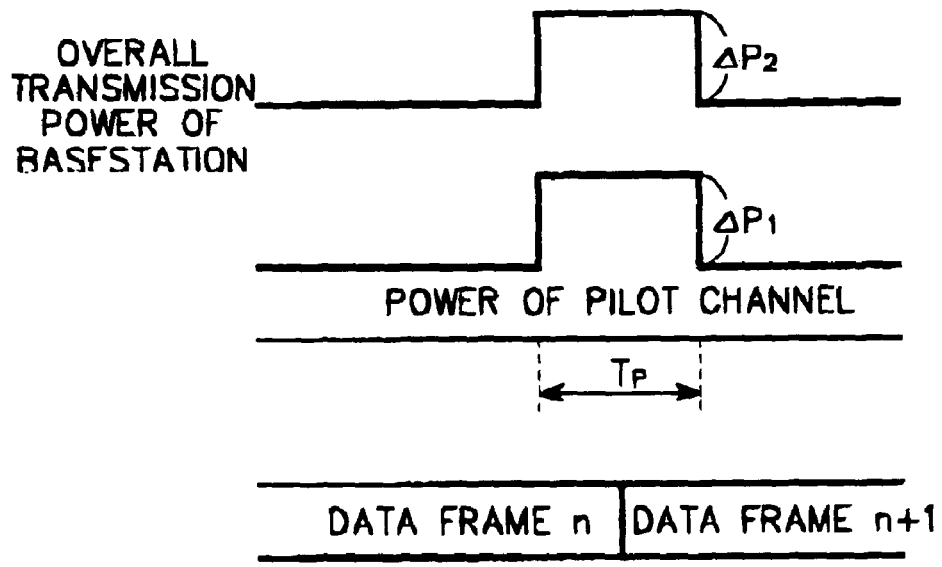

FIGS. 4A and 4B illustrate the structure of a forward link according to embodiments of the present invention. Here, a base station sends a pilot signal at an instantaneously increased power level so that a terminal can acquire pilot signals from a plurality of base stations. The forward channels include the pilot channel, the sync channel, the paging channel, the control channel, and the traffic channel.

Referring to FIG. 4A, the base station increases the power of the pilot signal on the pilot channel from its usual power level by $\Delta P_1$ for a predetermined time period Tp. In this embodiment, the entire transmission power of the base station is not changed. That is, signals on some data channels are sent at a decreased transmission power level or are not sent, and the rest of the available power is assigned to the pilot signal on the pilot channel. As such, the power of the pilot signal is higher than usual for the short time Tp. For more efficient set management, the entire transmission power of the base station may be assigned to the pilot channel for Tp.

The pilot signal can be transmitted at the predetermined time interval Tp only. That is, the pilot power level can be set to 0 except the predetermined time period Tp. The pilot power level increment P1 can be proportional to the power level of normal pilot channel, if the channel exists.

FIG. 4A shows a case where signals on some data channels are sent with low power or not sent for a time period defined by Tp. Also, Tp is specified at the boundary between two data frames. This is intended to prevent performance degradation of a single frame caused by transmission of a data channel signal at a lower power level than usual. In addition, Tp is preferably located over two consecutive data frames, with Tp/2 over each data frame, for uniform performance of the two data frames. The terminal which acquires synchronization should already know the value specified Tp and its location with respect to the data frames.

Tp can vary with the propagation environment of the base station, arrangement of base stations, and signal bandwidth. For larger values of Tp (i.e., longer in time), a higher gain is obtained. In addition, for larger values of Tp, the terminal can even acquire a pilot signal transmitting at a lower power. However, there exists an upper bound in that if Tp is too long, the pilot signal on the pilot channel occupies the power which otherwise would be assigned to transmit data, resulting in a decrease in system capacity. Therefore, the system needs to adjust Tp according to the system environment. For example, assuming that a system has a chip rate of 3.6864 Mcps (mega chips per second), a data frame is 20 ms in duration, and Tp includes 2048 chips, Tp is determined to be 0.55 ms in duration. In the embodiment illustrated in FIG. 4A, Tp is equally divided over the two frames and thus the power of the pilot signal is higher than usual for 0.28 ms (=0.55 ms/2) over each data frame. This is a very short period, that is, 1.4% of a 20 ms data frame. The resulting degradation of the forward link performance is negligibly small.

FIG. 4B shows another embodiment of increasing the power of a pilot signal on the pilot channel for a time period Tp. Here, data channel signals are sent for a time Tp, the entire transmission power of the base station is increased by an amount $\Delta P_2$ for the duration of the transmission, Tp. The pilot signal power is increased by $\Delta P_1$ for Tp. Here, $\Delta P_2$ and $\Delta P_1$ may be equal or different. That is, this embodiment is characterized by the concurrent increase of the entire transmission power of the base station and the pilot signal power. As a result, the rates of the pilot signal power and the overall transmission power of the base station are temporarily increased from their ordinary levels. Assuming that a usual overall transmission power density of the base station is Ior and energy per chip of the pilot signal on the pilot channel is Ec, $$\frac{\text{pilot } Ec + \Delta P_1}{Ior + \Delta P_2} > \frac{\text{pilot } Ec}{Ior} \qquad (1)$$

Equation 1 illustrates the fact that the ratio of the pilot signal power to the overall transmission power of the base station is instantaneously higher than usual.

It should be noted that it is feasible for the power of the pilot signal on the pilot channel to rise to the usual overall transmission power of the base station (i.e., usual overall transmission power $+\Delta P_2$). In this case, the base station transmits only the pilot signal and punctures other data channels.

The embodiment of FIG. 4B is the same as that of FIG. 4A in that Tp is located at the data frame boundary, and the terminal should know the value of Tp and its location. Tp can be periodic or determined by the base station.

If there are a plurality of base stations around a terminal, the base stations are synchronized with respect to Tp so that the base stations can increase the power of their respective pilot signals concurrently. It is further contemplated that the base stations can otherwise increase their pilot signal powers alternately. The time period Tp when each base station increases its pilot signal power can be periodic or determined by the base station.

Figure 5A:
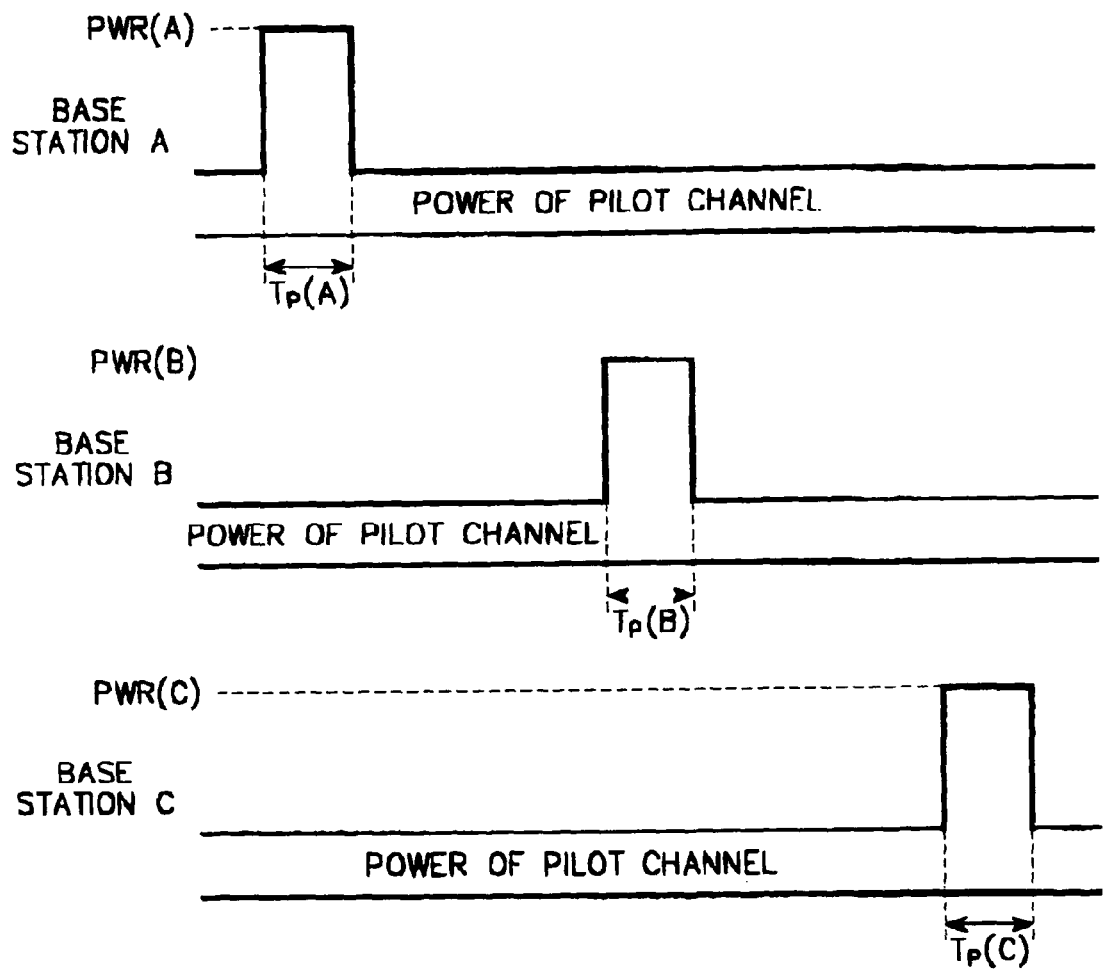
FIGS. 5A and 5B illustrate example of increased pilot channel power when there are a plurality of base stations.
Figure 5B:
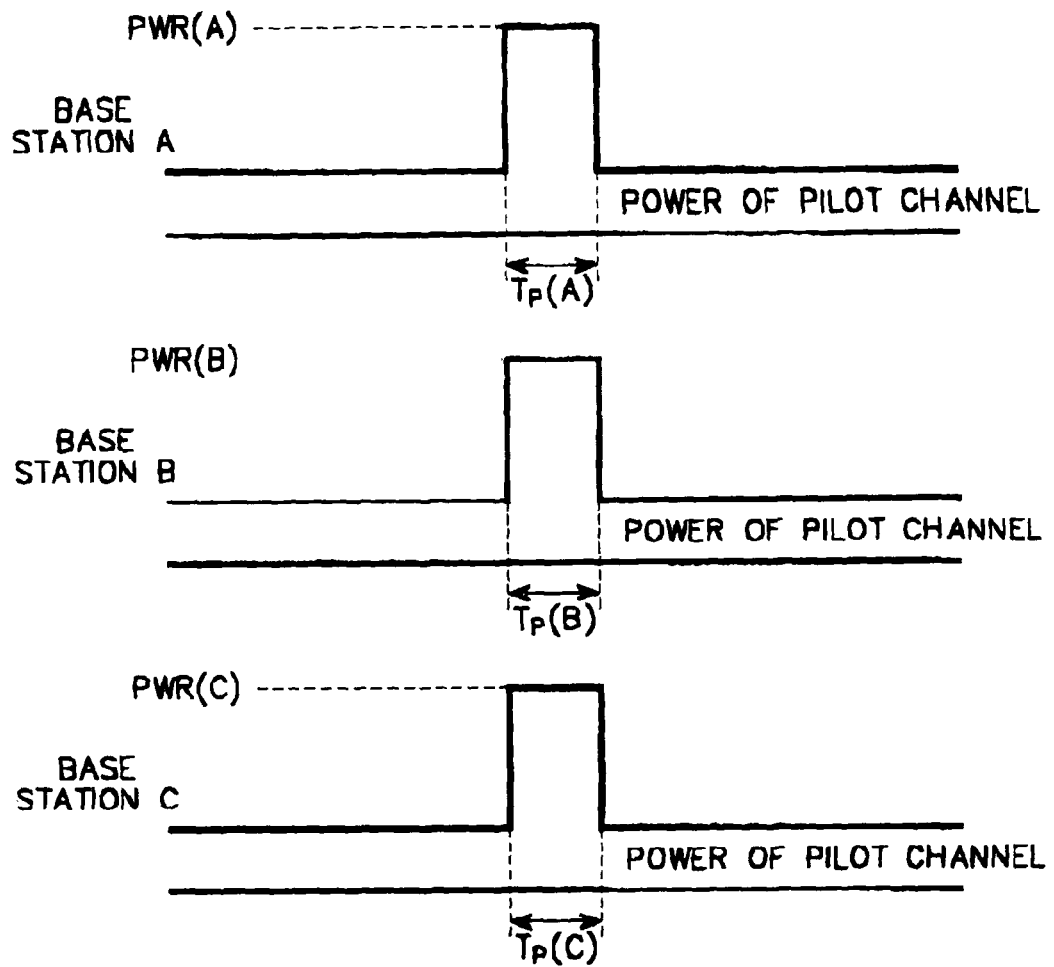

FIGS. 5A and 5B illustrate operations of base stations with a plurality of timings synchronized. In the drawings, only pilot signal power is shown. Here, the overall transmission power of a base station can be maintained at a usual level or increased by $\Delta P_2$ as shown in FIG. 4A. The significant thing is that the ratio of the pilot signal power to the overall transmission power of the base station is instantaneously higher than usual.

FIG. 5A illustrates an embodiment where each base station increases its pilot signal power at a different time. Which base station sends a pilot signal at a higher power level and at what time are preset between the terminal and the base stations. Since the terminal can identify a base station which sends its pilot signal at a higher power level, it despreads the corresponding pilot signal of an input signal and measures the reception level of the pilot signal. For this purpose, a widely used serial searcher or a matched filter can be used. Use of the serial searcher reduces hardware complexity but requires a long Tp, adversely affecting system capacity. On the other hand, despite increased hardware complexity, the matched filter can vastly reduce Tp, which is beneficial to system capacity. Furthermore, an input signal can be stored in a memory prior to despreading. With this scheme, Tp can be shorter without increasing receiver complexity. The structure of a receiver having the advantage according to the present invention will be described later with reference to FIG. 12.

In FIG. 5A, one base station increases the power of a pilot signal on a pilot channel, and the other base stations maintain the power of pilot channels at a usual level. It is also contemplated that base stations may be divided into groups, where one or more groups of base stations may be made to increase the power of a pilot channel. For example, if the totality of base stations define a set S, the set S may be divided into a plurality of subsets S1, S2, . . . , SM. Then, base stations within a subset would increase pilot power for a specified time period and the other base stations maintain pilot power at their usual level. The subsets S1, S2, . . . , SM can be designed such that there are not any intersections between subsets, or vice versa.

FIG. 5B illustrates another embodiment of an operation according to the present invention directed to a plurality of base stations. In FIG. 5B, the plurality of base stations concurrently increase the power of a pilot signal on a pilot channel. An agreement is made between a terminal and the base stations on when to increase the power of the pilot signal from the usual level. Since the terminal knows which base station will send a pilot signal at a higher level, it despreads an input signal with a spreading code for a corresponding pilot channel and measures the reception level of the pilot channel. Signals from a plurality of base stations can be despread concurrently to measure the strength of a pilot signal received from each base station, or they can alternatively be immediately stored in a memory prior to despreading. The structure of a receiver having such a configuration according to the present invention will be described later in detail with reference to FIG. 12.

Tp may be predetermined as a constant value, or may vary for each base station to obtain the best effect by taking the geographical environment of the base station and its cell size into account in the embodiments depicted in FIGS. 5A and 5B. In addition, pilot power levels PWR(A), PWR(B), and PWR(C) which define the measured power level of the pilot channels may be set to an identical value when the terminal is located in a handoff region. The terminal compares the strengths of pilot channels received from base stations when it implements a handoff, and if the pilot powers are different, the terminal has difficulty in comparing relative power rates of the base stations.

Figure 6:
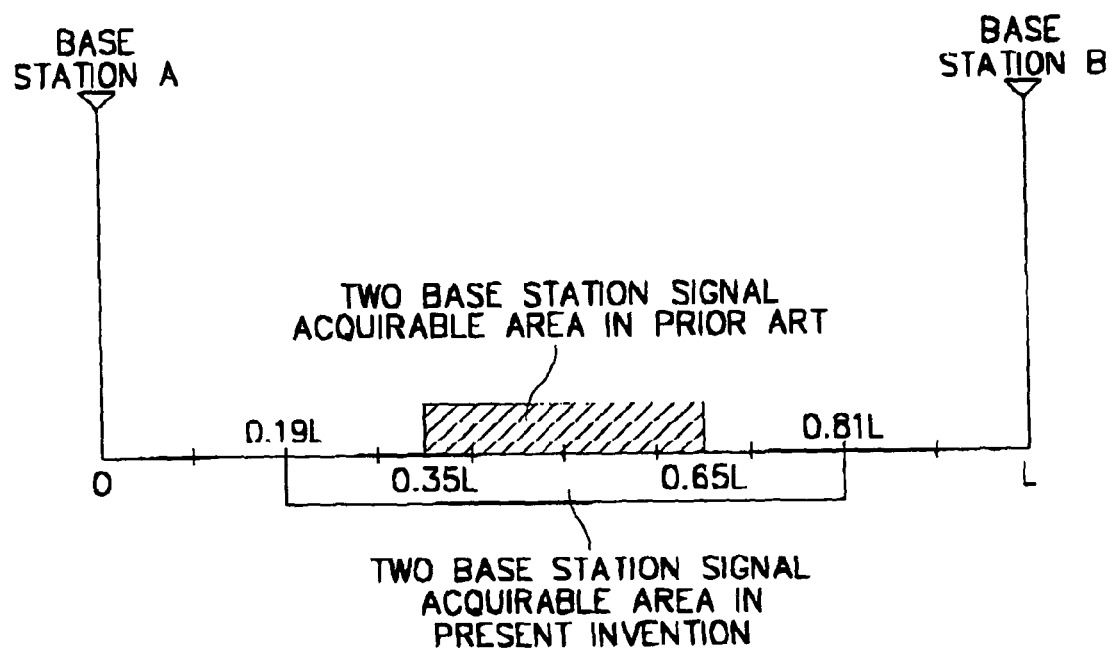
FIG. 6 is a view referred to for exemplarily illustrating effects of increasing the pilot channel power according to the embodiments of the present invention.

FIG. 6 illustrates the effects of increasing the power of a pilot signal according to the embodiments of the present invention. In FIG. 6A, it is assumed that there exist two base stations and a terminal despreads input signals during the same integration time period, to show an area where two base station signals are acquired in the prior art. Also shown in FIG. 6A is an extended area for acquiring a base station signal and a base station signal acquirable area extended by increasing the power of a pilot signal according to the present invention. Here, a chip rate is 3.6864 Mcps and a pilot Ec/Ior is usually sent at −12 dB. Ior is the power spectral density of a signal sent from a base station, and the integration time period during spreading is 2048 chips. In addition, Tp occupies 2048 chips and the terminal stores the input signals in a memory prior to despreading. It is assumed that the channels exist in a stationary propagation environment without multipath, wave strength is proportional to a 3.5 square of distance, and the terminal can acquire a base station signal only if a pilot Et/Io is 11 dB or higher after despreading. Et represents the energy of a despread signal and Lo represents the power spectral density of an input signal.

Referring to FIG. 6, let the distance between base stations be L, the location of a base station A be 0, and the location of a base station B be L. Then, signals from the base stations A and B can be acquired as long as the terminal is located between 0.35 L and 0.65 L from the base station A in accordance with the prior art, whereas the two signal acquiring area is greatly increased to 0.19 L to 0.81 L by assigning the total base station power to a pilot channel for a predetermined period Tp in the present invention. The same effect can be achieved with a plurality of base stations. This method can be applied, for example, to location estimation on a forward link.

There is another advantage with instantaneously increasing the ratio of the pilot signal power to the overall transmission power by increasing the pilot signal power. The pilot signal is used for initial acquisition, channel estimation, and set management for handoff. As the bandwidth increases, a window size for finger assignment also increases. Hence, it is difficult to reduce the pilot power to or below a predetermined value. Higher system capacity can be obtained as compared with the prior art by lowering the power of the pilot signal in ordinary times and increasing the pilot power only for a specified time period, as described in the present embodiment.

If the pilot signal power is dropped to or below a predetermined value, a receiver should integrate an input signal for a longer time to measure the level of an input pilot signal on a pilot channel, resulting in degradation of measurement performance for finger assignment and set management. The performance degradation can be reduced by use of a terminal with more complex hardware and power consumption. Yet, the present invention guarantees a terminal performance as good as or better than a terminal performance based on IS-95 to be designed with simple hardware and low power consumption by instantaneously increasing the pilot signal power.

A multipath resolution capability of a received signal increases with a wider bandwidth, which implies that reception energy for each path is decreased. A rake receiver exerts improved performance as it demodulates signals from more paths. However, to acquire multiple paths at or below a predetermined level and assign them to a finger, correlation values should be produced for a long time. This may increase power consumption and complexity of the receiver. The present invention allows an efficient finger assignment by detecting a multipath signal at a low level through calculation of correlation values for a relatively short time period.

Efforts have been expended toward storing a received signal in a storing means prior to processing in the CDMA communication system. This method has been studied to determine whether it is effective in measuring reception level for a hard handoff between frequencies. By use of the pilot power increasing method of the present invention, the number of samples of an input signal to be stored in the storing means is markedly reduced, terminal hardware is simplified, the time required for calculating correlation values is reduced, and thus power is saved. That is, if the temporary increase of pilot signal power and a search for hard handoff between frequencies happen concurrently and a signal received for the time period of the temporary pilot power increase is stored, the number of input samples to be stored in the terminal and a search time through despreading are remarkably reduced. Besides the search for a hard handoff between frequencies, storing an input signal prior to despreading and processing a pilot signal can reduce complexity of a needed storage and signal processing amount.

While various effects of increasing pilot signal power for a specified time period have been described referring to FIGS. 4A and 4B, the effects are not limited to the embodiments depicted in the drawings, but commonly applied to all structures suggested in the present invention.

Figure 7:
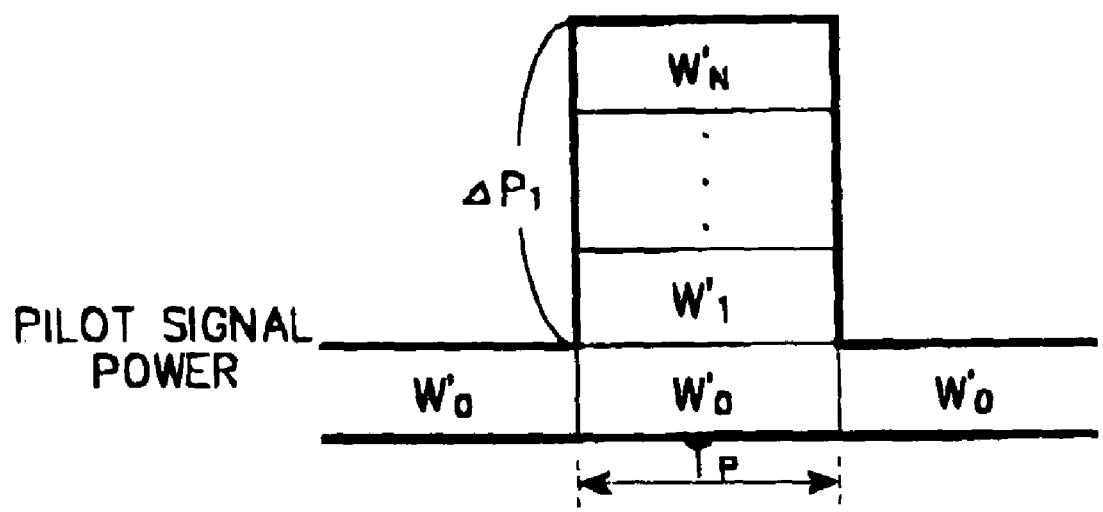
FIG. 7 illustrates a method of distributing the transmission power of a base station when a pilot channel is sent at divided power levels using a plurality of different spreading codes.

FIG. 7 illustrates distribution of the transmission power of a base station by dividing the power of a pilot signal using different spreading codes. The increase of the pilot signal strength for a short time is likely to influence receiving blocks including a channel estimator. If there exists a terminal in the same area which is not informed of the change of the pilot signal power for a short time or a terminal which has not been synchronized yet, a change of a pilot channel may give rise to problems like connection to a wrong base station.

In accordance with an embodiment illustrated in FIG. 7A, the power of a pilot channel is increased, the pilot signal with increased power is spread by different spreading codes and the resulting different code channels are transmitted, for a time period Tp. The spreading codes are exemplarily given as W'0, W'1, ..., W'n in FIG. 7A. This pilot channel is applicable to the structures previously described with reference to FIGS. 4A to 5B. Power for use in a common pilot channel is equally assigned to Tp and the other normal period and the pilot signal power increased for Tp is spread by a plurality of spreading codes different from a spreading code for the common pilot signal prior to transmission, not to affect other existing receivers. The common pilot signal refers to a pilot signal used in a normal period other than Tp.

In this case, the pilot signal P(t) is $$P(t)=G0*C0(t)+G1*C1(t)+\ldots+Gn*Cn(t) \quad (2)$$

where G0 to Gn are gains of code channels and C0(t) to Cn(t) are spreading codes for pilot channels.

In Eq. 2, it is assumed that a pilot channel is transmitted on different (n+1) code channels. The gains G0 to Gn can be expressed as complex numbers and the spreading codes C0(t) to Cn(t) can be orthogonal codes. It is also possible that the spreading codes C0(t) to Cn(t) are not orthogonal to each other.

Figure 8:
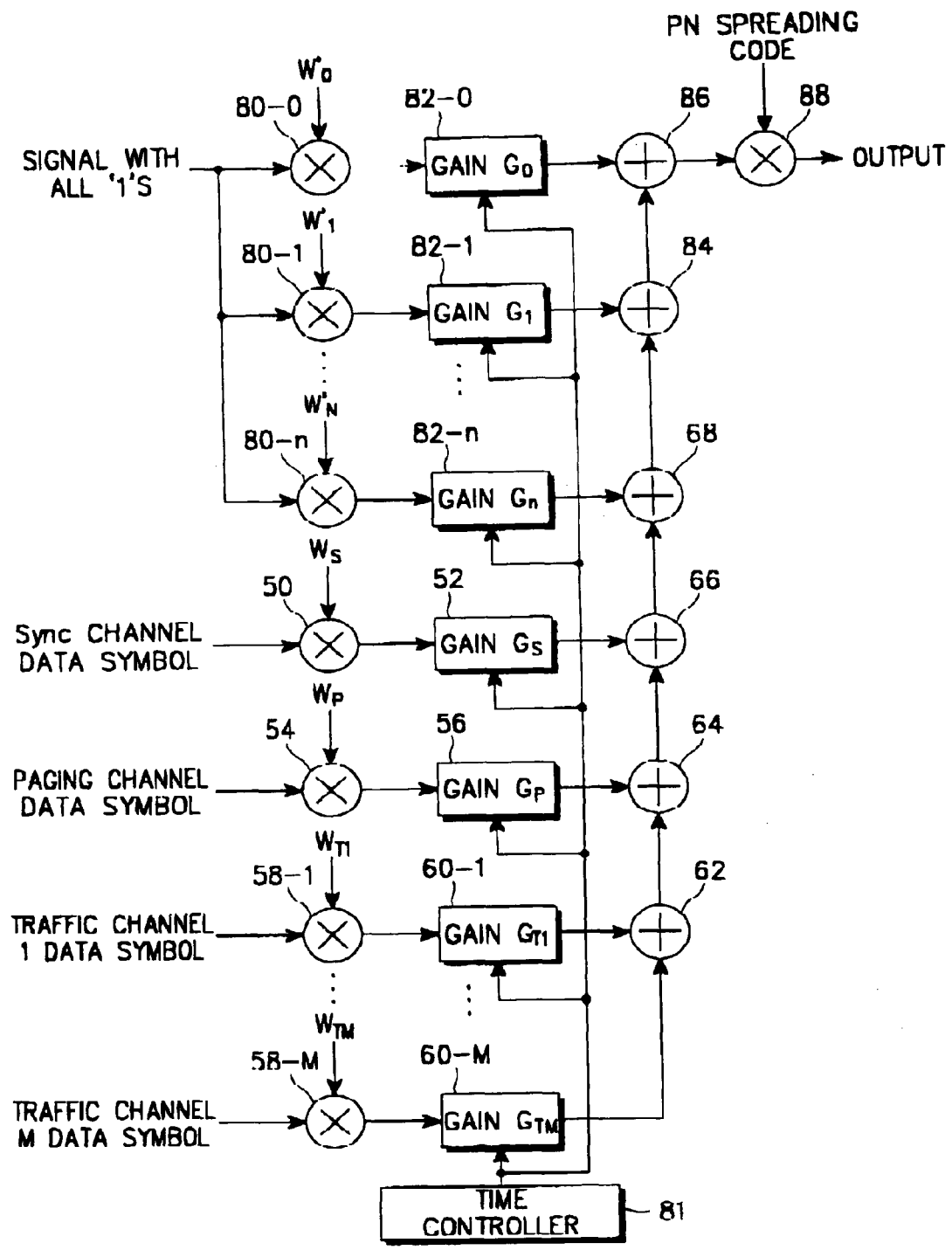
FIG. 8 is a block diagram of a transmitting device in a base station, for separately sending a pilot channel using a plurality of spreading codes.

FIG. 8 is a block diagram of a transmitting device in a base station, for separately transmitting a pilot channel signal with a plurality of spreading codes. The pilot channel signal is spread by a plurality of orthogonal codes, multiplied by different gains, and spread by the same spreading code, for transmission. The base station transmitting device of FIG. 8 shows other channel transmitters as well as a pilot channel transmitter. The transmitting device includes the pilot channel transmitter for sending the pilot channel by n different Walsh codes, a synch channel transmitter, a paging channel transmitter, and M traffic channel transmitters. A time controller 81 controls the gain of each channel at a specified time.

In the embodiments illustrated by FIGS. 4A and 4B where the pilot signal power is instantaneously increased, the time controller 81 controls the gain of each channel for a time period Tp so that the pilot signal is transmitted at a higher power level than usual. The power of other channels are changed within a range determined by the overall transmission power of the base station for a time period Tp. It is to be appreciated that while the base station transmitting device for increasing the pilot channel power for a specified time has been described in connection with FIG. 8, the transmitting device is applicable to structures which will be later described by appropriately controlling the gain of each channel.

In operation, a pilot signal being all 1 s is spread by the orthogonal codes W'0, W'1, ..., W'n in respective multipliers 80-0, 80-1, ..., 80-n, and then multiplied by different gains G0, G1, ..., Gn in respective gain controllers 82-0, 82-1, ..., 82-n whose operating times are controlled by the time controller 81. The outputs of the gain controllers 82-0, 82-1, ..., 82-n are added in adders 84, 86, and 68 and multiplied by the same PN (Pseudo Noise) spreading code, for transmission. That is, the pilot channel signal is spread by a plurality of orthogonal codes, multiplied by different gains, and spread by the same spreading code, prior to transmission.

In FIG. 8, a synch channel data symbol signal is spread by an orthogonal code Ws in a multiplier 50 and multiplied by a gain Gs in a gain controller 52 whose operating time is controlled by the time controller 81. Then, the output of the gain controller 52 is added in an adder 66 and multiplied by the same PN spreading code in the multiplier 88, for transmission.

A paging channel data symbol signal is spread by an orthogonal code Wp in a multiplier 54 and multiplied by a gain Gp in a gain controller 56 whose operating time is controlled by the time controller 81. Then, the output of the gain controller 56 is added in an adder 64 and multiplied by the same PN spreading code in the multiplier 88, for transmission.

A traffic channel 1 data symbol signal is spread by an orthogonal code $W_{T1}$ in a multiplier 58-1 and multiplied by a gain GT1 in a gain controller 60-1 whose operating time is controlled by the time controller 81. Then, the output of the gain controller 60-1 is added in an adder 62 and multiplied by the same PN spreading code in the multiplier 88, for transmission. In this manner, a traffic channel M data symbol signal is spread by an orthogonal code $W_{TM}$ in a multiplier 58-M and multiplied by a gain $G_{TM}$ in a gain controller 60-M whose operating time is controlled by the time controller 81. Then, the output of the gain controller 60-M is added in the adder 62 and multiplied by the same PN spreading code in the multiplier 88, for transmission.

Spreading a pilot signal by different spreading codes more than usual for a specified time period, for transmission, and a transmitting device for implementing the operation have been described with reference to FIGS. 7 and 8. This scheme is commonly applicable to all structures according to the present invention as well as the embodiments of FIGS. 4A and 4B.

The challenging issue in acquiring signals from a plurality of base stations on a forward link by a terminal is that a terminal near to a base station cannot detect signals from other base station because the terminal receives a very strong signal from the nearby base station. That is, the signal of the nearby base station interferes with a signal from a remotely located base station, making it impossible for the terminal to detect the signal of the remote base station. To overcome this problem, the present invention decreases the overall transmission power of the nearby base station for a predetermined time Td.

Figure 9A:
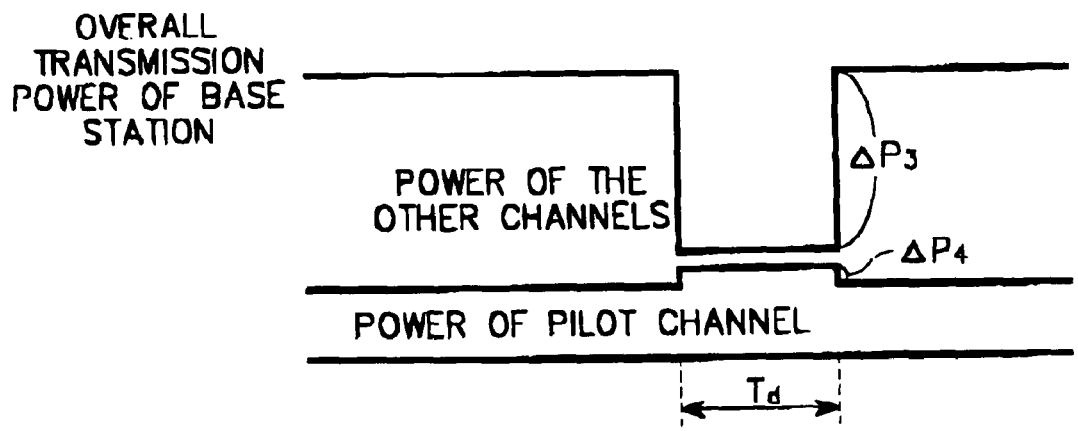
FIGS. 9A and 9B illustrates an example where the entire transmission power of a base station drops for a time period Tp.
Figure 9B:
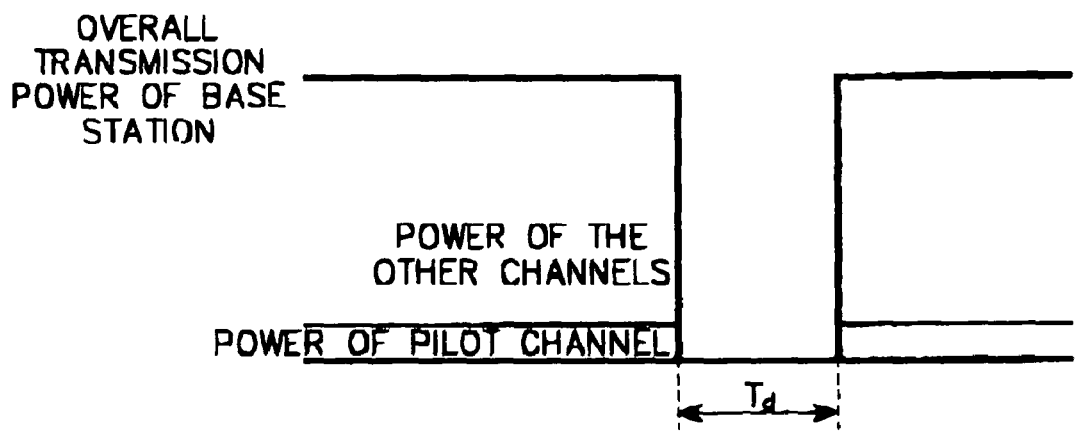

FIGS. 9A and 9B illustrate embodiments in which the overall transmission power of a base station is lowered for Td. A corresponding base station sends some channel signals at a lower power level than usual or does not send them, for Td. Td is preset by mutual agreement between the base station and a terminal. Td can be periodic or determined by the base station.

FIG. 9A illustrates the embodiment where the base station sends a base station signal at a lower than normal power level for a time period Td. Here, the decrement is $\Delta P3$, and the transmission power of a pilot channel signal may be changed. In FIG. 9A, the decrement of the pilot signal power is $\Delta P4$. Assuming that the overall transmission power density Ior and energy per chip of a pilot channel is Ec, $$\frac{\text{pilot } Ec + \Delta P_4}{Ior - \Delta P_3} > \frac{\text{pilot } Ec}{Ior} \quad (3)$$

Though $\Delta P4$ is a positive number in the embodiment of FIG. 9A, it can be a negative numeral as long as it satisfies Eq. 3. $\Delta P4$ can be zero to minimize an influence on other block in a receiver.

It is noted from Eq. 3 that the ratio of the pilot signal power to the overall transmission power of the base station is temporarily higher than usual for a time period Td. In the embodiment of FIG. 9A, the overall transmission power of the base station is reduced and the pilot signal power is changed within a range satisfying Eq. 3, so that the ratio of the pilot signal power to the overall transmission power of the base station is temporarily higher than usual. The embodiments of FIGS. 4A and 4B aim at controlling the ratio of the pilot channel power to the overall transmission power by increasing the pilot channel power, while the embodiment of FIG. 9A focuses on controlling the ratio of the pilot channel power to the overall transmission power by lowering the overall transmission power. As shown in FIG. 9A, the increase of the pilot channel power and the decrease of the overall transmission power can occur concurrently. Or the base station can send only the pilot channel for Td.

For a time period Td the base station may send no signals, that is, it does not send the pilot signal. FIG. 9B illustrates this scheme. That is, signals are sent at ordinary times but no signals including a pilot signal are sent for Td.

Figure 10A:
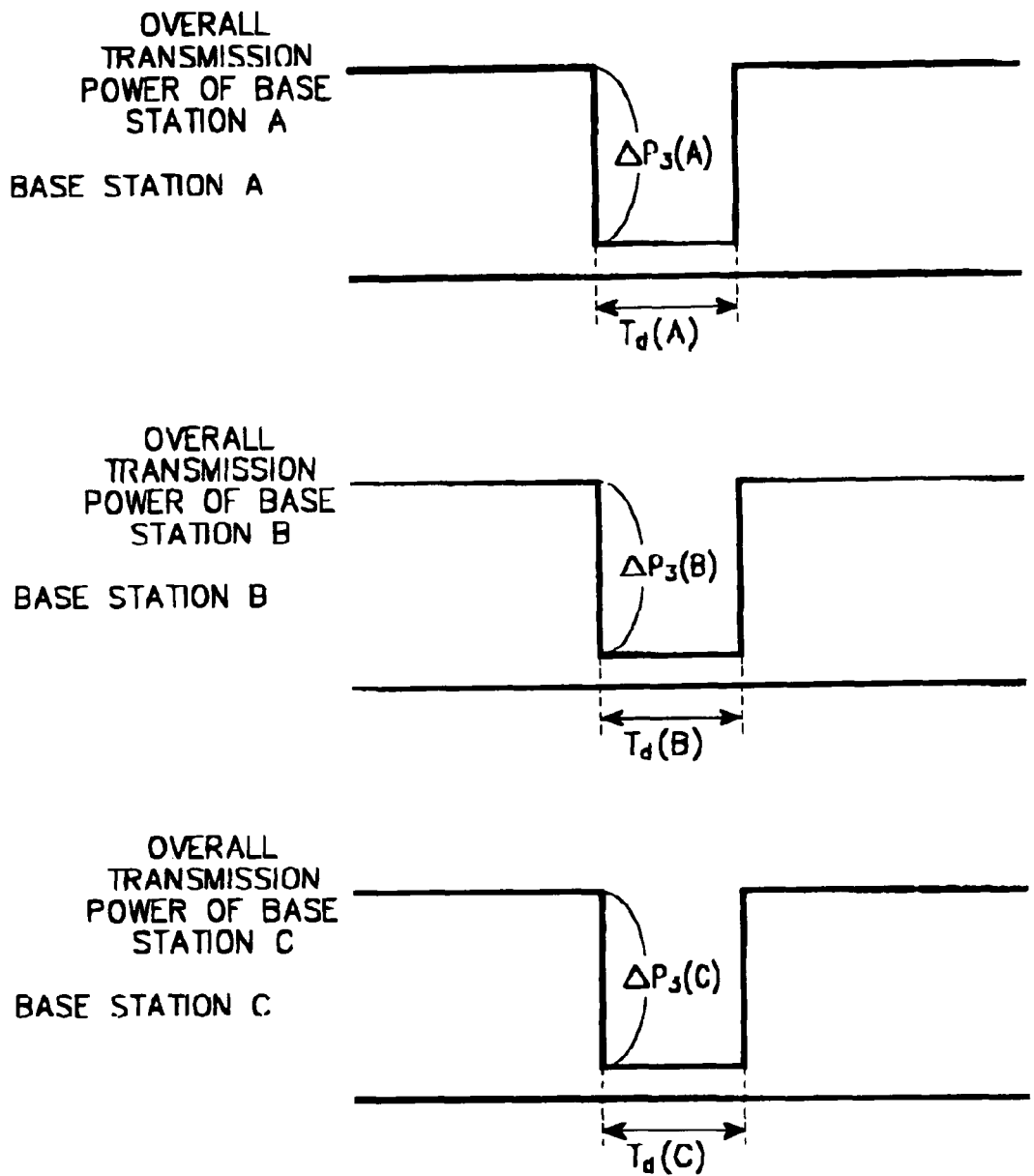
FIG. 10A illustrates an example where a plurality of base stations concurrently drop their entire transmission powers.
Figure 10B:
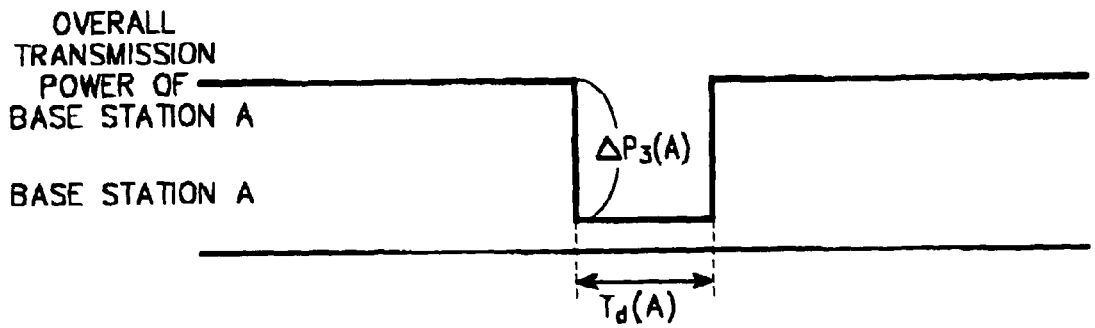
FIG. 10B illustrates an example where a plurality of base stations drop their entire transmission powers by turns.
Figure 10B:
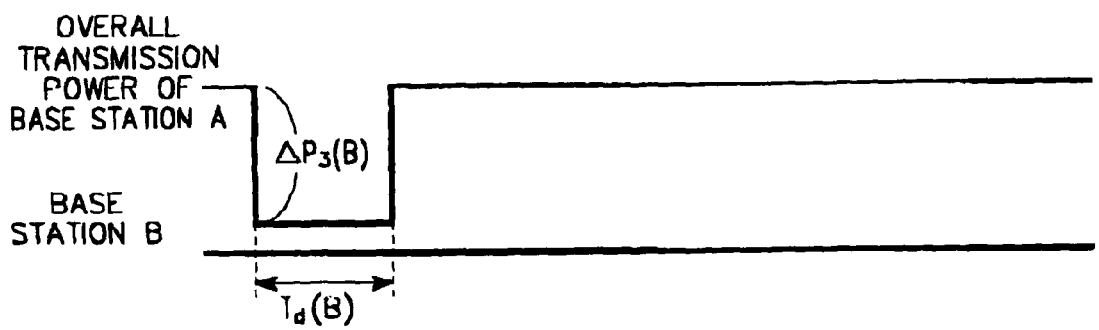
Figure 10B:
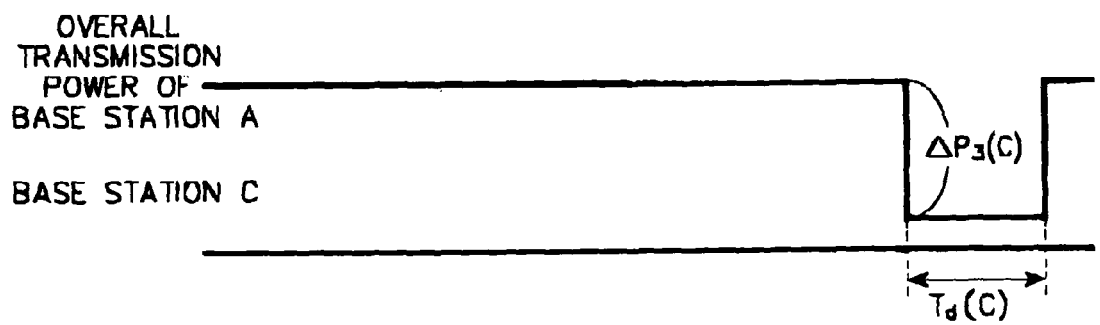
Figure 10C:
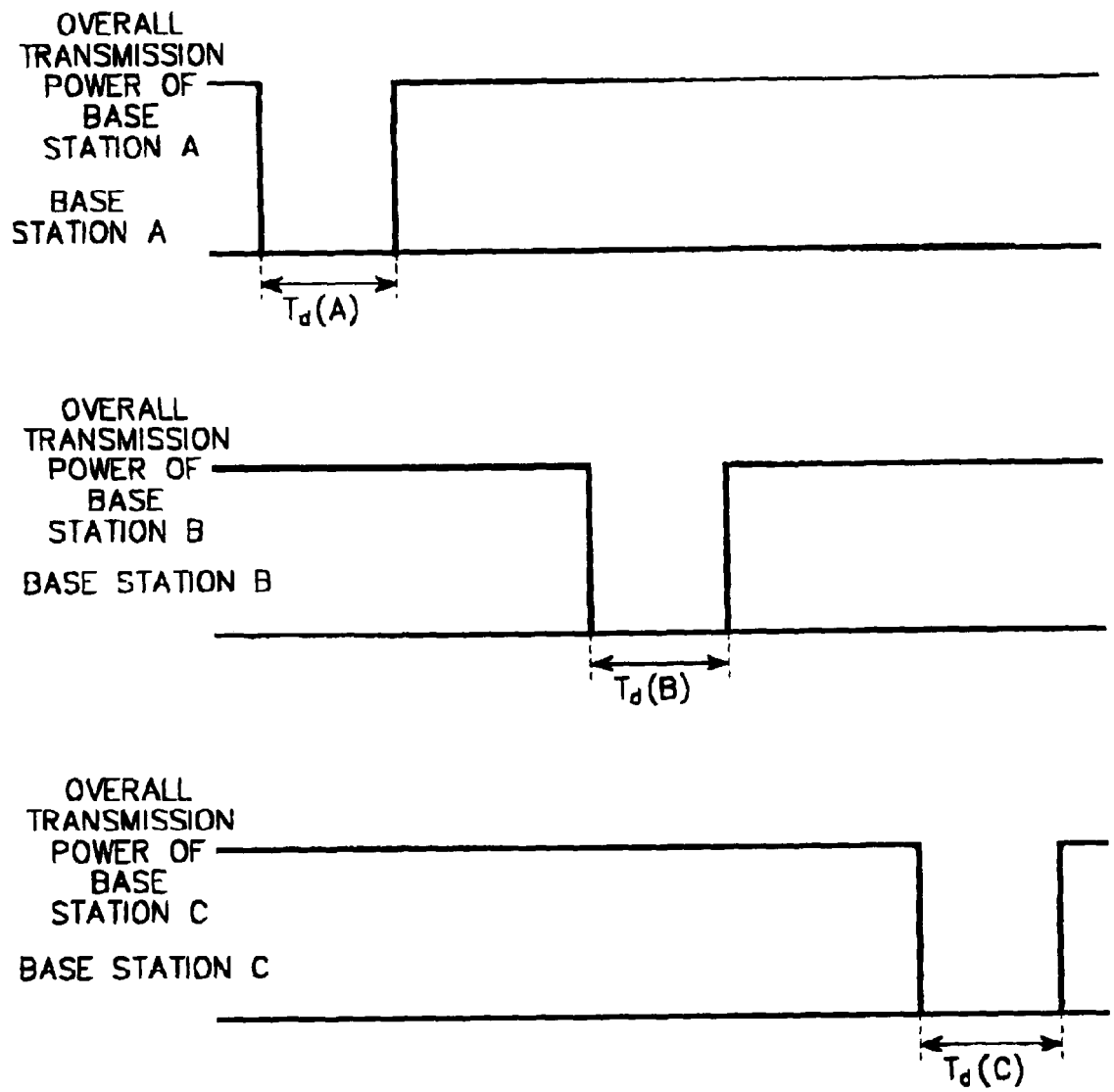
FIG. 10C illustrates an example where a plurality of base stations stop transmission of signals for a specified time period.

If there are a plurality of base stations in the vicinity of a terminal, Td is implemented by synchronization among the base stations. This is illustrated in FIGS. 10A, 10B, and 10C. It is assumed here that each base station is synchronized to a GPS (Global Positioning System). Td can be periodic or determined by a base station.

FIGS. 10A, 10B, and 10C illustrate the overall transmission power of a base station. In the embodiments depicted in FIGS. 10A and 10B, the pilot signal power satisfies Eq. 3. In addition, the pilot signal power of the plurality of base stations can be set to be identical in order to facilitate comparison between reception levels of the pilot signals from the base stations. The embodiments of FIGS. 10A and 10B are based on the assumption that the pilot signal power is not changed for a time period Td.

Referring to FIG. 10A, the plurality of base stations are synchronized and their overall transmission power is lowered at the same time. The pilot channel is continuously sent for Td, and the pilot signal power can be changed within a range satisfying Eq. 3. Here, the pilot channel power of each base station can be set to a constant level. The transmission powers of base stations A, B, and C are lower than usual by $\Delta P3(A)$, $\Delta P3(B)$, and $\Delta P3(C)$, respectively.

Time periods Td(A), Td(B), and Td(C) when the base stations lower their overall transmission power can be changed depending on their surroundings and cell sizes. The effect of the embodiment shown in FIG. 10A is that the ratio of the pilot channel power to the overall transmission power of a base station is instantaneously increased by lowering the overall transmission power of the base station. That is, the ratio of the pilot channel power to the overall transmission power of a base station is instantaneously increased by increasing the pilot channel power in FIGS. 4A and 4B, while by lowering the overall transmission power of the base station in FIG. 10A. In the embodiment of FIG. 10A, the terminal can easily detect signals from other base stations since pilot signals sent from the base stations are relatively strong.

FIG. 10B illustrates another embodiment of the method of lowering the overall transmission power of a base station for a specified time period. It is assumed that each base station is synchronized to a GPS time. Unlike the previous embodiment, all base stations do not decrease their overall transmission power. That is, only one base station lowers its overall transmission power. Yet, a plurality of base stations can reduce their overall transmission power and the other base stations perform normal operations. In this embodiment, there are three base stations A, B, and C, the time periods Td(A), Td(B), and Td(C) when the base stations A, B, and C reduce their overall transmission power are different, and the power drop occurs alternately in the base stations A, B, and C while the other base stations send signals at their normal overall transmission power levels.

FIG. 10C is a further embodiment of the method of lowering the overall transmission power of a base station for a specified time period in an area with a plurality of base stations. Referring to FIG. 10C, the overall transmission power of a base station is decreased to zero (0) as shown in FIG. 9B, and the base station sends no signals including a pilot channel signal for a time period TD when the base station lowers the overall transmission power. Therefore, a terminal closer to the base station sending no signals can detects signals from other base stations.

Let all the base stations be grouped into a set S and the set S be divided into a plurality of subsets S1, S2, ..., SM. Then, base stations within a particular subset reduce their overall transmission power, possibly to zero, for a specified time period, and the other base stations maintain their usual transmission power levels. If the overall transmission power levels of the corresponding base stations are not reduced to zero, their pilot channel signal power can be changed within a range satisfying Eq. 3 for Td. Here, M is the number of the subsets. The subsets S1, S2, ..., SM can be designed such that there are no intersections between the subsets or where each subset has an intersection with another subset.

As described above, the present invention enables a terminal to easily acquire signals from a plurality of base stations by changing the power of a pilot signal sent from a particular base station or by changing the overall transmission power of the base station for a predetermined time Tp or Td and thus increasing the ratio of the pilot channel power to the overall transmission power from a normal value. Alternatively, a terminal near to a base station can easily acquire signals from other base stations by temporarily stopping transmission of signals from the nearby base station. Increasing the pilot signal power and decreasing the overall transmission power in combination lead to more benefits. The combination will be described later in detail with reference to FIGS. 11A and 11B.

Figure 11A:
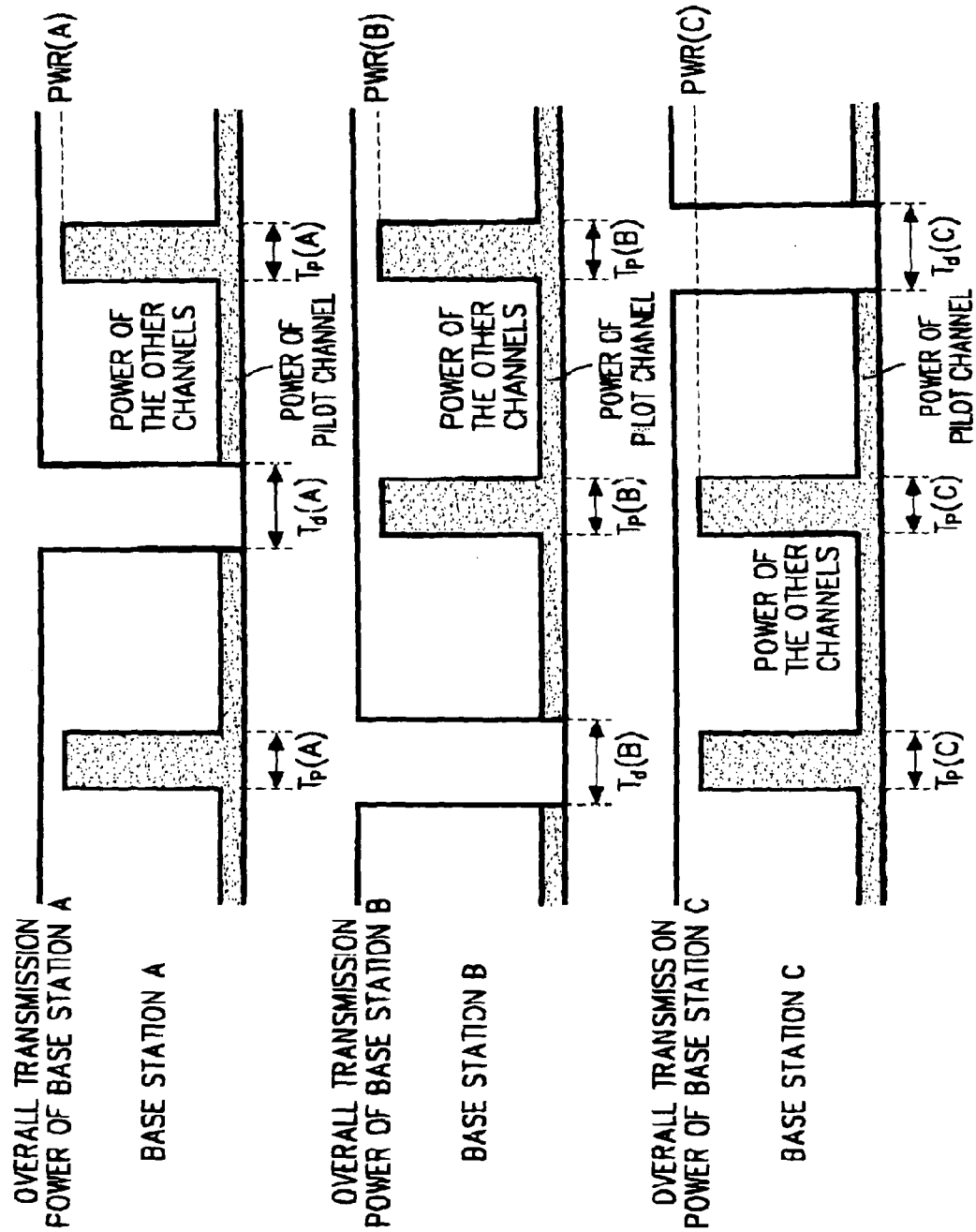
FIGS. 11A and 11B illustrate examples where both the increase of pilot power and the decrease of the entire transmission power concurrently occur.

FIG. 11A illustrates an embodiment of a combined scheme of increasing pilot signal power and decreasing overall transmission power. It is assumed that the plurality of base stations A, B, and C are synchronized to one another with use of a GPS, for example. Referring to FIG. 11A, some base stations reduce their overall transmission power and the other base stations increase their pilot signal power. Three base stations are shown, but the number of the base stations is not limited. The three base stations send no forward signals for Td. The time periods Tp(A), Tp(B), and Tp(C) when the base stations A, B, and C increase their pilot signal power can be set to different values. The time periods Td(A), Td(B), and Td(C) when they reduce their overall transmission power can also be different While the overall transmission power of the base stations are not changed for Tp in this embodiment, it can be increased as shown in FIG. 4A. Tp and Td are periodic or determined by the base stations.

Pilot signals can be increased to an identical level for the base stations which do not reduce their overall transmission power. In FIG. 11A, when the base station A reduces its overall transmission power, the pilot signal power level PWR (B) of the base station B is made to be equal to that PWR(C) of the base station C, so as to allow a terminal to accurately measure the relative power level of an input signal. If the base stations A, B, and C always increase their pilot signal power to a predetermined level, that is, PWR(A)=PWR(B)=PWR (C)=K (the predetermined level), the terminal can accurately measure the power levels of pilot signals received on pilot channels from the base stations A, B, and C.

While the pilot signal power of each base station is part of the overall transmission power of the base station for Tp in the embodiment shown in FIG. 11A, the pilot signal power can be increased to the overall transmission power level.

Figure 11B:
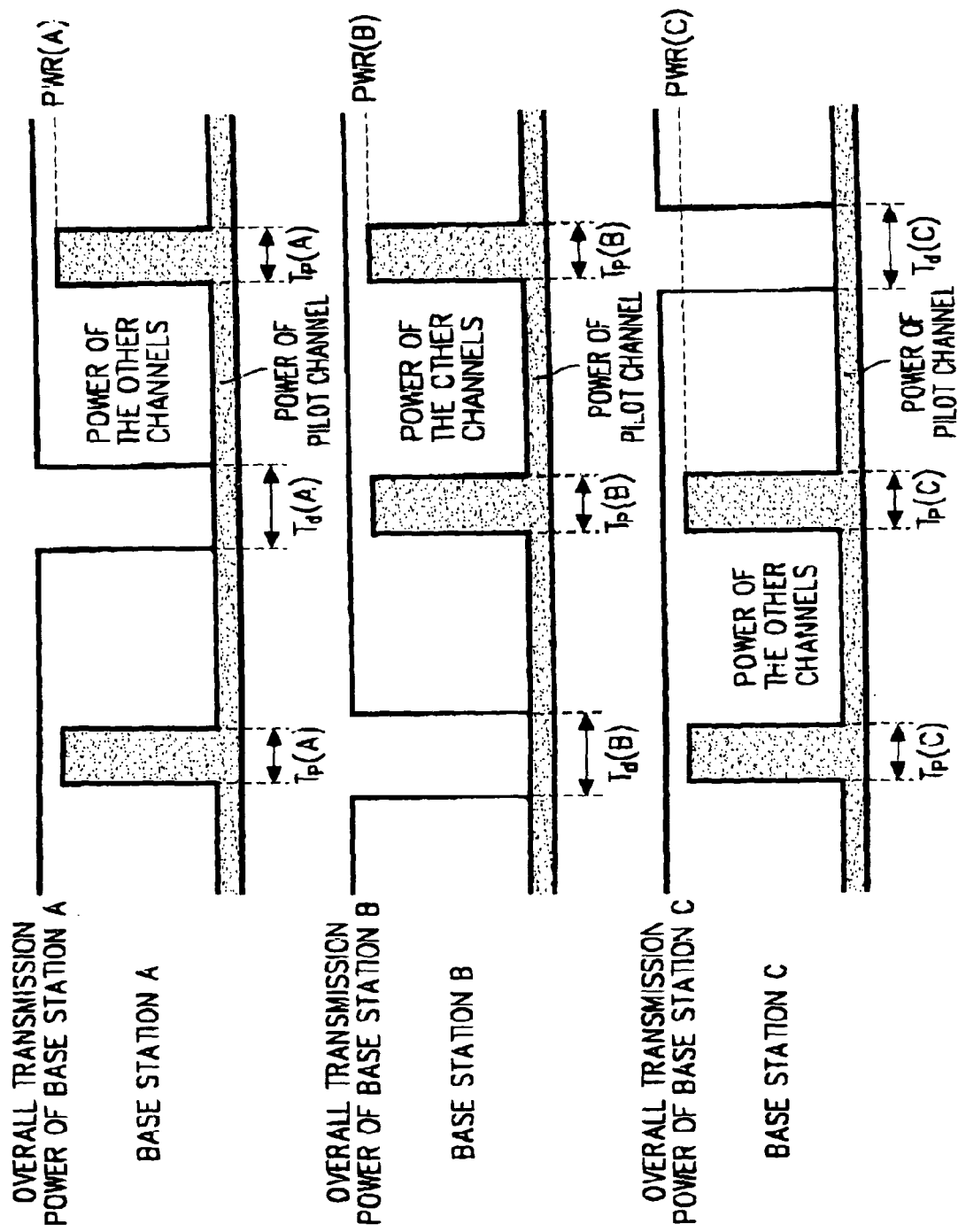

FIG. 11B illustrates another embodiment of a combined scheme of increasing pilot signal power and decreasing overall transmission power. In FIG. 11B, the base stations A, B, and C transmit some channels without stopping signal transmission for Td(A), Td(B), and Td(C). While only the pilot channel is transmitted for Td(A), Td(B), and Td(C). In this embodiment, other channels can also be transmitted for the time periods Td(a), Td(B) and Td(C). In addition, the pilot signal power can be changed from its usual level for Td(A), Td(B), and Td(C). That is, the scheme of FIG. 9A is applicable for Td, and the scheme of FIGS. 4A and 4B for Tp. The time periods Tp(A), Tp(B), and Tp(C) when the base stations A, B, and C increase their pilot signal power can be set to different values. The time periods Td(A), Td(B), and Td(C) associated with the reduction of overall transmission power can also be different.

As described above, the present invention enables a terminal to easily acquire signals from a plurality of base stations by changing the power of a pilot signal sent from a base station or the overall transmission power of the base station for the predetermined time Tp or Td, or by combining the two schemes, and thus increasing the ratio of the pilot chip energy Ec of a received pilot channel to a mobile reception power density Io for a specified time.

In various schemes according to the embodiments of the present invention, a terminal detects signals from a plurality of base stations by despreading signals received for Tp or Td and measures the levels, propagation delays, or relative propagation delays in a multipath, of the received signals. Which parameter to measure in the terminal vary depending on an intended purpose. If the terminal aims at measuring the distance between the terminal and a base station to thereby estimate its location, the necessary principal parameter is propagation delay. If the purpose of the terminal is finger assignment or handoff, the principal parameters to be measured are propagation delay in a multipath and signal level.

For example, for the purpose of location estimation, a terminal measures the distances between the base stations and the terminal using propagation delays among measured parameters and sends information about the distances to the base station in communication with the terminal. Therefore, the location of the terminal with respect to the base station in communication can be determined from the distance information. For finger assignment or set management for a handoff, the terminal will perform a set management for adjacent base stations using propagation delays and signal levels among the measured parameters.

A widely used serial searcher can be used in a receiver of the terminal in despreading and searching the signals. However, use of the serial searcher has the problem that Tp or Td may be set to be long. To reduce Tp or Td, the searcher of the receiver is configured as follows to perform despreading and search.

(1) A matched filter is used for the searcher. The matched filter can rapidly calculate a correlation value between a received signal and a partially generated spreading code. Despite the advantage of the rapid production of a correlation value, the matched filter increases complexity of receiver structure and power consumption.

The matched filter is difficult to achieve due to the limitations. In particular, if the power of a pilot channel is low, an integration period is long when calculating the correlation value between the received signal and the partially generated spreading code. Such a matched filter causes a great problem when it is used in a terminal. Yet, possible concurrence between a matched filter operating time and a time when the ratio of the pilot channel power to the overall base station power is temporarily changed may remarkably reduce the integration time needed to obtain the correlation value. As shown in FIG. 5A, a plurality of base stations sequentially change the ratios of pilot channel power to overall transmission power and the matched filter of the terminal can despread a signal with the spreading code of the base station which temporarily increases the ratio of the pilot channel power to the overall transmission power. It is impossible to calculate a correlation value between a received signal and a spreading code by use of the matched filter even in the structure of FIG. 5B. In this case, a despreading can be performed with a spreading code of a base station, or an input signal is stored in a memory and then despreading is sequentially performed.

(2) A received signal around Tp or Td is stored in a memory of a receiver and then a correlation value between this signal and a partially generated spreading code is calculated. This scheme requires the memory for storing the received signal but simplifies despreading and reduces power consumption. Here, the searcher is assumed to be a serial searcher.

In an embodiment of the present invention, a searcher is configured according to the second scheme. The structure of the searcher according to the embodiment of the present invention is illustrated in FIG. 12.

Figure 12:
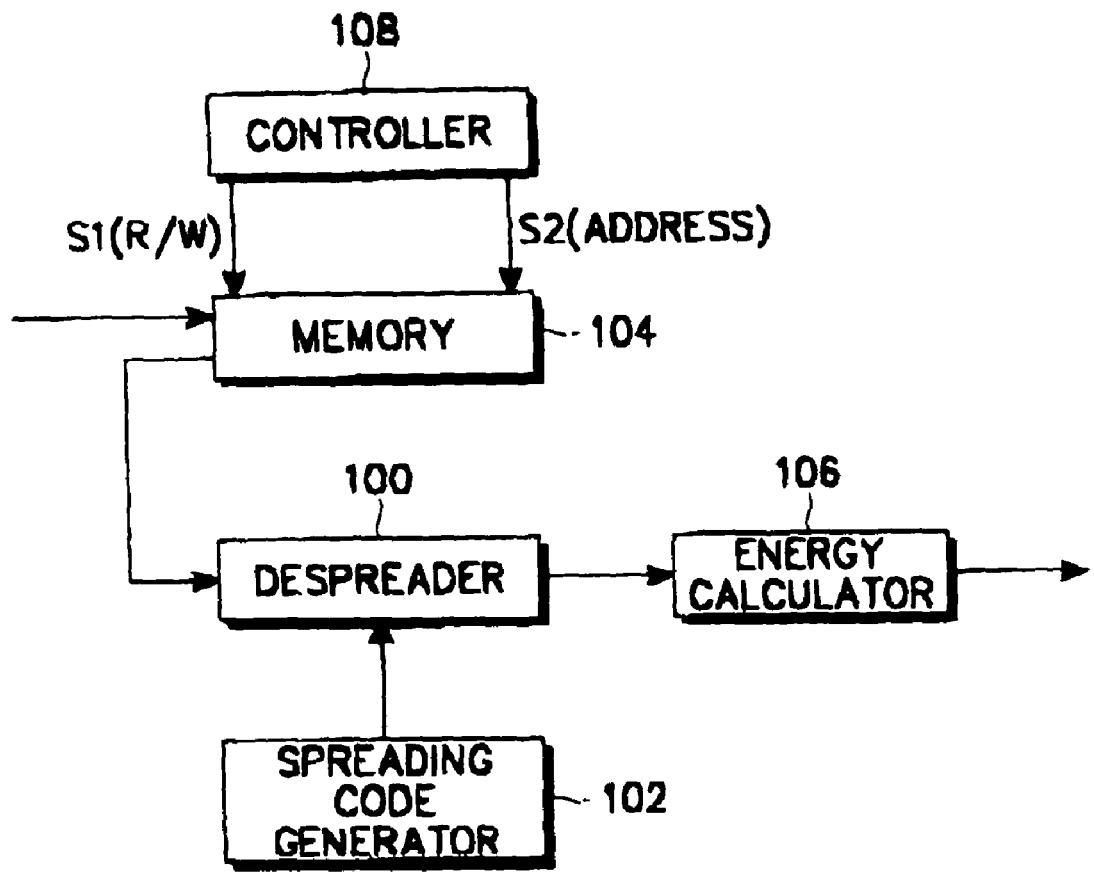
FIG. 12 is a block diagram of a searcher of a receiver in a terminal according to an embodiment of the present invention.

Referring to FIG. 12, the searcher according to the embodiment of the present invention is comprised of a despreader 100, a spreading code generator 102, a memory 104 for storing an input signal, an energy calculator 106, and a controller 108. The memory 104 stores an input signal around Tp or Td under the control of the controller 108. The controller 108 applies a control signal S1 (read/write) commanding the input signal around Tp or Td to be stored in the memory 104, and a control signal S2 (address) indicating at what position in the memory 104 to store the input signal. Upon input of a signal, the controller 108 increases the address of the control signal S2 and stores the input signal in the memory 104. Then, the controller 108 causes the memory 104 to output the stored signal to the despreader 100. Here, the controller 108 controls the memory 104 to output the stored signal by means of the control signal S1 and designates a storing position by means of the control signal S2. The spreading code generator 102 locally generates the same spreading code as a transmitter of a base station and applies it to the despreader 100. The despreader 100 multiplies the input signal received from the memory 104 by the spreading code and integrates the resulting value for a predetermined time. The spreading code generator 102 locally generates a spreading code (i.e., a Walsh code). The energy calculator 106 calculates the energy of the despread signal. To do so, the sum of the squares of despread values with respect to I and Q axes, that is, $I^2+Q^2$ is obtained. This is Ec/Io of a received pilot channel. Here, Ec represents energy per chip of an input signal and Io represents the power spectral density of an entire received CDMA signal.

Figure 13:
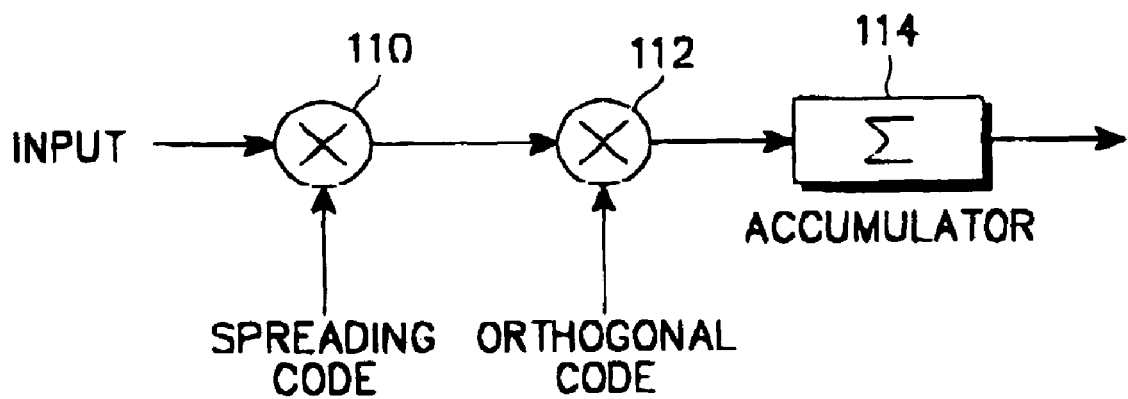
FIG. 13 is a block diagram of a despreader in the searcher of FIG. 12.

FIG. 13 is a block diagram of the despreader 100 shown in FIG. 12. All signals in FIG. 13 are expressed as complex numbers. In an embodiment of FIG. 13, a pilot channel is spread with a spreading code like the forward link shown in FIG. 4.

Referring to FIG. 13, a multiplier 110 multiplies an input signal by a PN spreading code for despreading. A multiplier 112 multiplies the despread signal received from the multiplier 110 by a corresponding orthogonal code, for orthogonal demodulation. An accumulator 114 accumulates the output of the multiplier 112 in symbol units.

Figure 14:
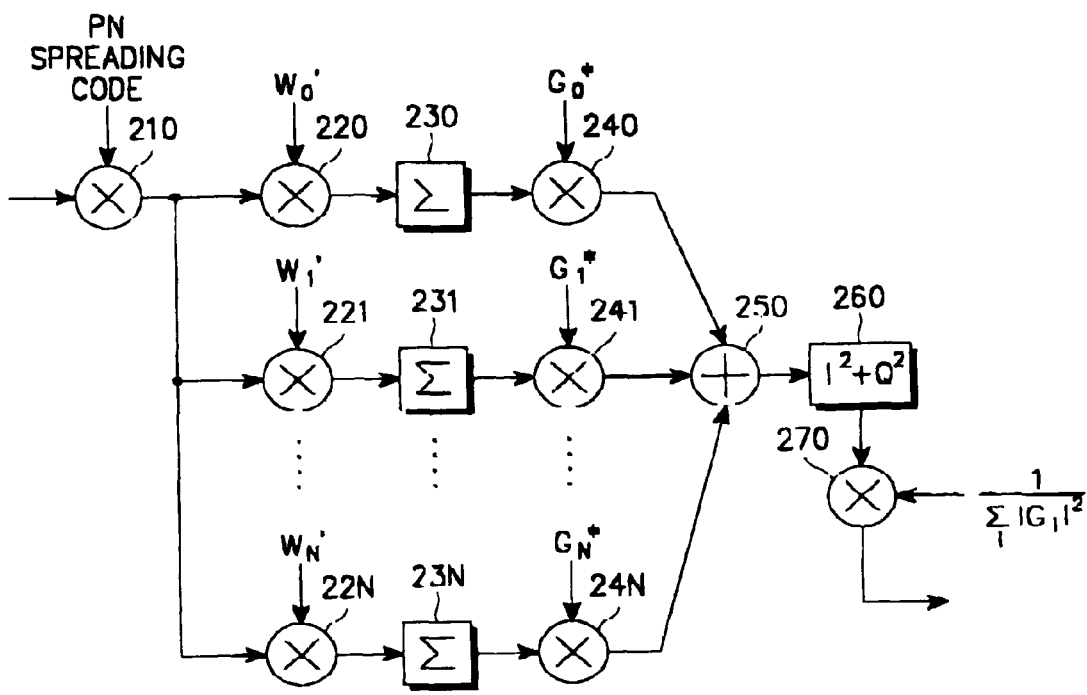
FIG. 14 is a block diagram of a first embodiment of a despreader in a receiver of a terminal.

FIG. 14 is a block diagram of a despreader for despreading a pilot signal which was spread with a plurality of spreading codes as shown in FIGS. 7 and 8, in a receiver according to a first embodiment of the present invention. The first embodiment of FIG. 14 is a despreader employed for the case where a pilot channel is spread with the plurality of orthogonal codes W'0, W'1, . . . , W'n and then with a single common PN spreading code in a base station. Here, all signals take the form of complex numbers.

Referring to FIG. 14, a multiplier 210 multiplies an input signal by a PN spreading code, for despreading. Multipliers 220 to 22N receive a despreading signal from the multiplier 210 and multiply the despreading signal by corresponding orthogonal codes W0' to WN', for orthogonal demodulation. Accumulators 230 to 23N accumulate the outputs of the multipliers 220 to 22N. An accumulation period can be different for each accumulator to accumulate a channel which is transmitted at all times like a pilot signal spread by W'0 for a longer time. In this case, a gain multiplier in the receiver should be changed in consideration of the accumulation time. In the embodiment of the present invention, it is assumed that an accumulation period for an accumulator for receiving each orthogonal code channel is constant. Multipliers 240 to 24N multiply the outputs of the corresponding accumulators 230 to 23N by complex conjugates G0* to GN* of corresponding complex gains G0 to GN, for compensating the phases of the complex gains G0 to GN. An adder 250 adds the outputs of the multipliers 240 to 24N. A squarer 260 squares the output of the adder 250 and converts the resulting value to an energy value. A multiplier 270 multiplies the output of the squarer 260 by the sum of the squares of the gains of channels to normalize the output of the squarer 260.

As shown in FIG. 14, an input signal is multiplied by a PN spreading code, for despreading in the multiplier 210. The despread signal is multiplied by corresponding orthogonal codes in the multipliers 220 to 22N. Signals output from the multipliers 220 to 22N are accumulated in symbol units in the accumulators 230 to 23N. Then, the multipliers 240 to 24N multiply the outputs of the accumulators 230 to 23N by corresponding gains G0* to GN* to thereby compensate for phase components of the complex gains multiplied by the orthogonal channels. The adder 250 adds the phase-compensated signals and the squarer 260 converts the sum received from the adder 250 to an energy value. Then, the multiplier 270 multiplies the output gain of the adder 250 by $$\frac{1}{\sum_{2}|Gi|^2}$$

to normalize the output gain of the adder 250. That is, a value multiplied for the gain compensation is 1/the sum of the squares of the complex gains Gi(i=0, 1, 2, . . . , n) of the orthogonal codes. Here, the multiplier 270 is used to obtain a good gain compensation.

The despreader shown in FIG. 14 depsreads an input signal, accumulates the despread signal in symbol units, and then obtains the energy of the accumulated signals.

In FIG. 14, (n+1) despreaders despread an input signal in parallel. However, the receiver can despread only a part of (n+1) orthogonal codes received from a base station. That is, the receiver can despread some or all of the orthogonal codes assigned to a pilot channel in FIG. 7 though there is a light performance degradation.

Figure 15:
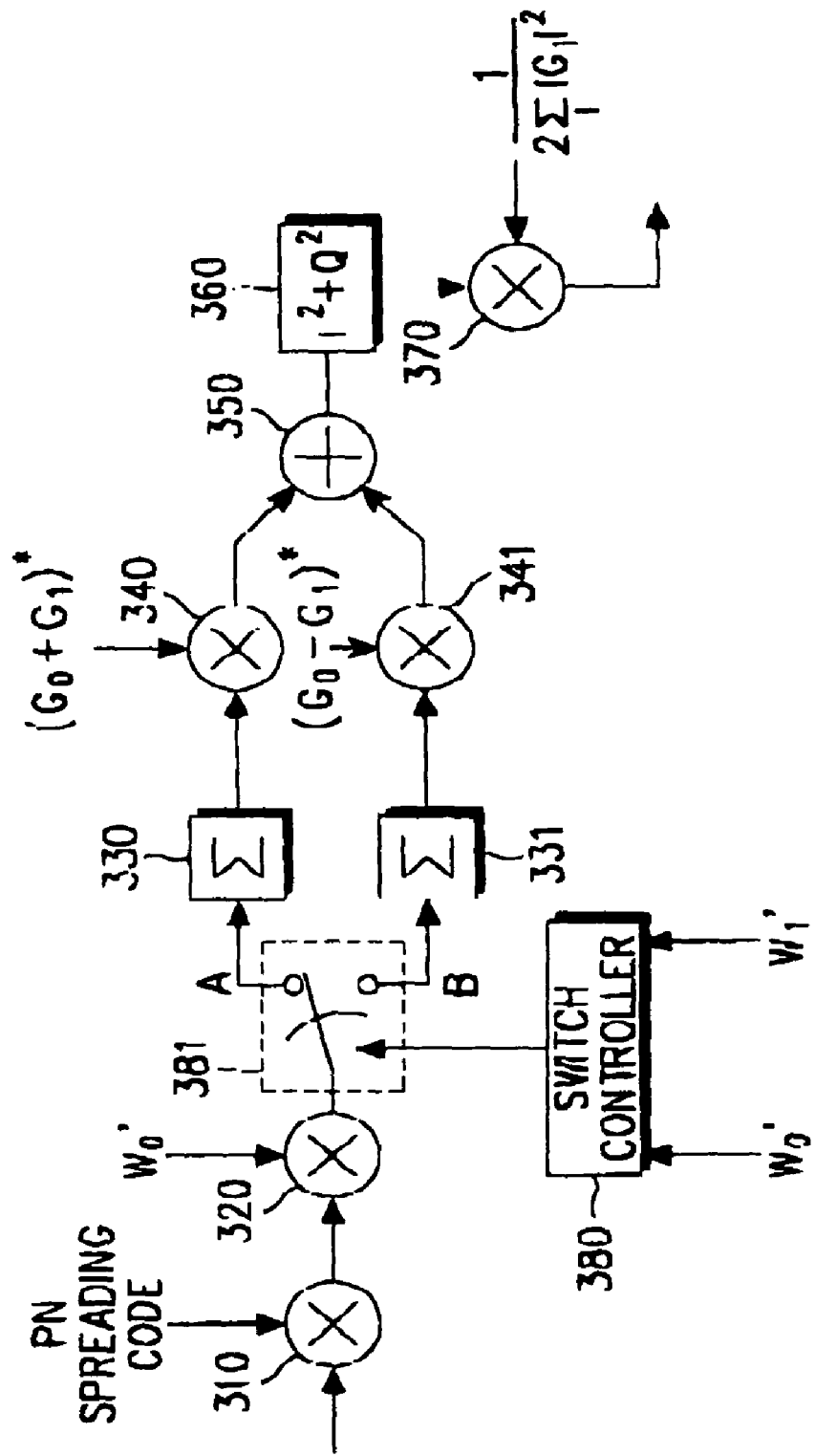
FIG. 15 is a block diagram of a second embodiment of the despreader in the receiver of the terminal.

FIG. 15 illustrates a despreader in a terminal receiver according to a second embodiment of the present invention, which is employed in the case where a transmitter in a base station spreads a pilot channel by a plurality of orthogonal codes. In the despreading method according to the second embodiment of the present invention, input signals having the same spreading codes are grouped to reduce power consumption, as compared to the structure of FIG. 14. While two orthogonal codes are used here, this structure can be extended to a plurality of orthogonal codes. All signals in FIG. 15 take the form of complex numbers.

Referring to FIG. 15, a multiplier 310 multiplies an input signal by a PN spreading code, for despreading. A multiplier 320 multiplies the output of the multiplier 310 by an orthogonal code and generates an orthogonally demodulated output. Here, the orthogonal code applied to the multiplier 320 is assumed to be W'0. A switch controller 380 receives the orthogonal codes W0' and W1' and searches the two orthogonal codes in chip units. If W0'(i)=W1'(i), the switch controller 380 generates a control signal for selecting a first path, and If W0'(i)=W1'(i), the switch controller 380 generates a control signal for selecting a second path. The orthogonal code W0'(i) is the ith chip of the orthogonal code W0' and the orthogonal code W1'(i) is the ith chip of the orthogonal code W1'. A switch 381 has an input terminal connected to the multiplier 320, a first output terminal connected to a first path A, and a second output terminal to a second path B. The switch 381 switches the output of the multiplier 320 to the first path A or the second path B according to the output of the switch controller 380.

An accumulator 330 accumulates signals received from the first path A. A multiplier 340 multiplies the output of the accumulator 330 by a complex gain (G0+G1)* and thus compensates for the phase gain of a signal output to the first path A. Signals switched to the first path A have orthogonal codes comprised of chips of the same sign. An accumulator 331 accumulates signals received from the second path B. A multiplier 341 multiplies the output of the accumulator 331 by a complex gain (G0–G1)* and thus compensates for the phase gain of a signal output to the second path B. Signals switched to the second path B have orthogonal codes comprised of chips of different signs. An adder 350 adds the outputs of the multipliers 340 and 341. A square 360 squares the output of the adder 350 to be converted to an energy value. A multiplier 370 multiplies the output of the squarer 360 by $$\frac{1}{2\sum\limits_{2}|Gi|^2}$$

to normalize the output of the squarer 360.

The operation of the structure shown in FIG. 15 will be described from a theoretical perspective. Here, the length of the orthogonal codes W0 and W1 used in FIG. 15 is 8 chips (i=8). It is assumed that the pattern of W0' is +1, +1, +1, +1, −1, −1, −1, −1, and the pattern of W1' is +1, +1, −1, −1, +1, +1, 1, −1. Then, the orthogonal codes W0 and W1 are

TABLE 1

| orthogonal code | chip number | | | | | | | |
|---|---|---|---|---|---|---|---|---|
|  | i1 | i2 | i3 | i4 | i5 | i6 | i7 | i8 |
| W0' | +1 | +1 | +1 | +1 | −1 | −1 | −1 | −1 |
| W1' | +1 | +1 | −1 | −1 | +1 | +1 | −1 | −1 |

Assuming that an input signal to the despreader is $r_1, r_2, r_3, r_4, r_5, r_6, r_7, r_8$ and gains multiplied by the orthogonal codes are G0 and G1, the input signal spread by W0' is $$Y0=G_0^*(r_1+r_2+r_3+r_4-r_5-r_6-r_7-r_8)$$

$$Y1=G_1^*(r_1+r_2-r_3-r_4+r_5+r_6-r_7-r_8)$$

Here, a final output of the despreader is Y0+Y1.

The orthogonal codes W0' and W11' have the same chip components in the first, second, seventh, and eighth positions, and different chip components in the third, fourth, fifth, and sixth positions. The components of Y0+Y1 are classified depending on whether chip components of the orthogonal code W0' are the same as or different from those of the orthogonal code W1'. If these are called X0 and X1, $$X0=(G_0^*+G_1^*)(r_1+r_2-r_7-r_8)$$

$$X1=(G_0^*-G_1^*)(r_3+r_4-r_5-r_6)$$

Here, X0+X1=Y0+Y1. It is noted from the above formula that classification of inputs according to combinations of chip components of each orthogonal code reduces the number of additions performed during despreading. This is effective not with a shorter orthogonal code but with a longer orthogonal code.

The above scheme is implemented in hardware in FIG. 15. In FIG. 15, an input signal is multiplied by a PN spreading code in the multiplier 310 and by the orthogonal code W0'. Then, the switch controller 380 generates a switch control signal by determining whether chip components of the two orthogonal codes are the same or different. The switch 381 selectively outputs the output of the multiplier 320 to the two accumulators 330 and 331 based on the switch control signal. Here, a signal multiplied by the PN spreading code and then the orthogonal code W0' is applied to the input of the accumulator 330 in the first path A if the chip components of the two orthogonal codes W0' and W1' are the same, and to the input of the accumulator 331 in the second path if the chip components are different. Signals separated by the switch 381 are added in the accumulators 330 and 331 in symbol units. Then, the multiplier 340 multiplies the output of the accumulator 330 by $G_0^*+G_1^*$, and the adder 350 adds the outputs of the multipliers 340 and 341. The output of the adder 350 is squared in the squarer 360 and thus converted to an energy value. The multiplier 370 multiplies the output of the squarer 360 by a gain $$\frac{1}{2\sum\limits_{2}|Gi|^2}$$

for normalizing the resulting values from multiplying gains in the multipliers 340 and 341.

If a pilot signal is spread by a plurality of spreading codes for transmission in the above receiver, a terminal should know the power ratio or gain value assigned to each orthogonal code. This can be preset in standards or a base station can notify the terminal by a system parameter. Or the receiver can measure it in a simple algorithm. This can be estimated by obtaining the energy ratio of a despread signal for each orthogonal code.

Figure 16:
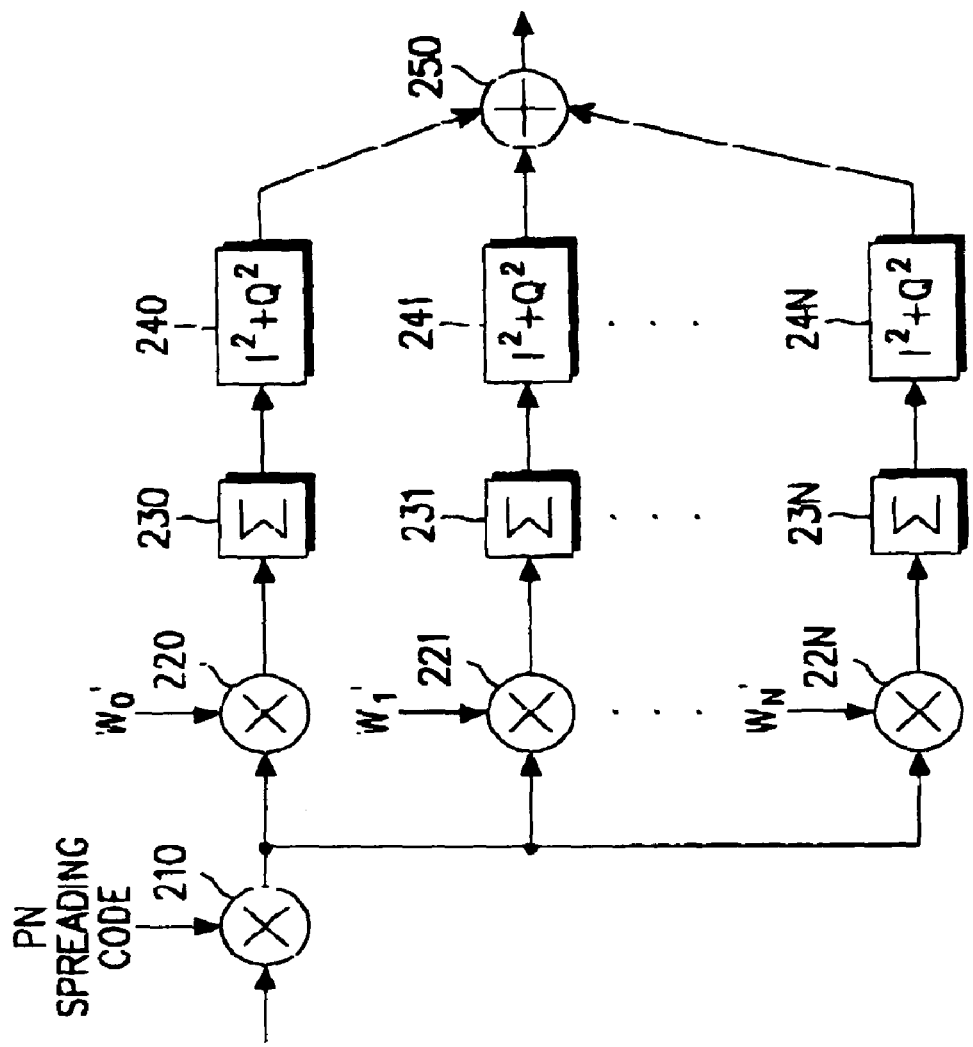
FIG. 16 is a block diagram of a third embodiment of the despreader in the receiver of the terminal.

FIG. 16 illustrates the structure of a despreader in a receiver according to a third embodiment of the present invention in the case where a pilot signal is spread by different spreading codes as shown in FIGS. 7 and 8. The third embodiment of FIG. 16 is for the case where a pilot channel is spread by a plurality of orthogonal codes W0', W1', . . . , Wn' and then by a common PN spreading code. All signals in FIG. 16 take the form of complex numbers.

Referring to FIG. 16, a multiplier 210 multiplies a received signal by a PN spreading code, for despreading. Multipliers 220 to 22N multiplies a despread signal received from the multiplier 210 by corresponding orthogonal codes W0' to WN', for orthogonal demodulation. Accumulators 230 to 23N accumulate the outputs of the multipliers 220 to 22N in symbol units. Squarers 240 to 24N square the outputs of the accumulators 230 to 23N to be changed to an energy value. An adder 250 adds the outputs of the squarers 240 to 24N.

In the despreader of FIG. 16, a received signal is despread and accumulated in symbol units, and then an energy value is obtained. The drawing illustrates the despreader and the energy calculator of FIG. 12 in detail. The despreader and the energy calculator of FIG. 16 calculates the energy of each channel and then adds the energies as compared to other despreaders. While despread values for the channels are added coherently in FIGS. 14 and 15, the energy of each channel is calculated and energies are added in FIG. 16. In this case, performance is slightly degraded relative to the despreader of FIGS. 14 and 15, but even if the gain of each channel is unknown, the power ratio of a plot channel received from a base station can be obtained.

Figure 17:
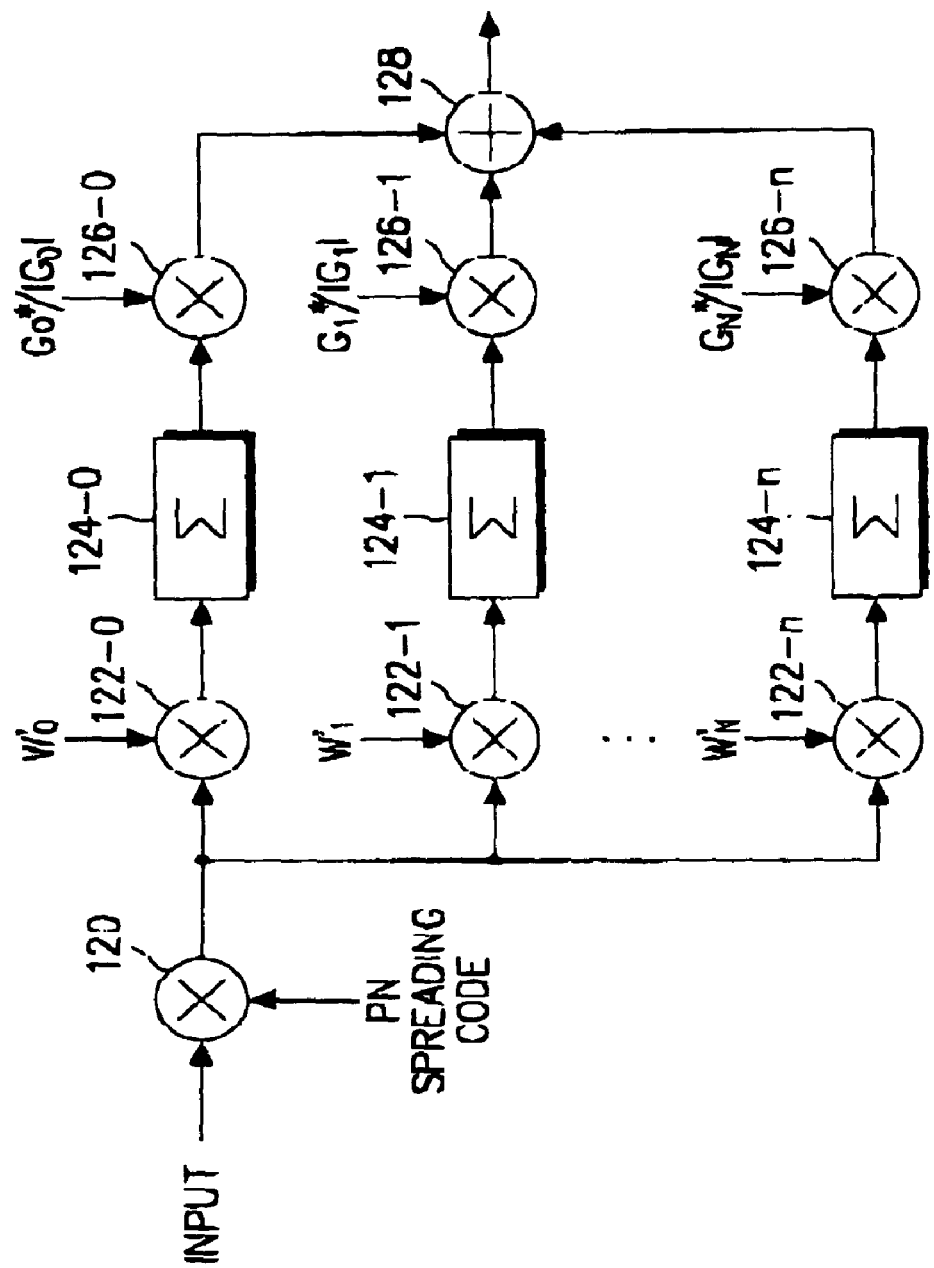
FIG. 17 is a block diagram of a fourth embodiment of the despreader in the receiver of the terminal.

FIG. 17 illustrates a despreader in a terminal receiver according to a fourth embodiment of the present invention. The embodiment of FIG. 17 is for the case a pilot channel of a base station is spread by (n+1) mutually orthogonal codes W0', W1', . . . , Wn' and then by a common PN spreading code. In FIG. 17, the despreader is comprised of a multiplier 120 for multiplying an input signal by a PN spreading code, (n+1) multipliers 122-0 to 122-n using (n+1) different orthogonal codes for despreading, (n+1) accumulators 124-0 to 124-n for accumulating different orthogonal channel signals for a specified time, (n+1) multipliers 126-0 to 126-n for compensating a phase multiplied by each orthogonal channel in a base station transmitter, and an adder 128 for adding the outputs of the multipliers 126-0 to 126-n. An input signal is multiplied by a PN spreading code in the multiplier 120 and then by different orthogonal codes W0' to WN' in the multipliers 122-0 to 122-n. The outputs of the multipliers 122-0 to 122-n are accumulated in the (n+1) accumulators 124-0 to 124-n for a predetermined time, for despreading, and then outputs to the corresponding multipliers 126-0 to 126-n. The multipliers 126-0 to 126-n act to compensate for phase component of a complex gain multiplied b each orthogonal channel in the transmitter. A value multiplied for phase compensation is a value resulting from dividing the complex conjugate of the complex gain $Gi(i=0, 1, 2, \ldots, n)$ by a corresponding signal strength $(Gi^*/|Gi|)$. The adder 128 adds the output signals of the multipliers 126-0 to 126-n.

Figure 18:
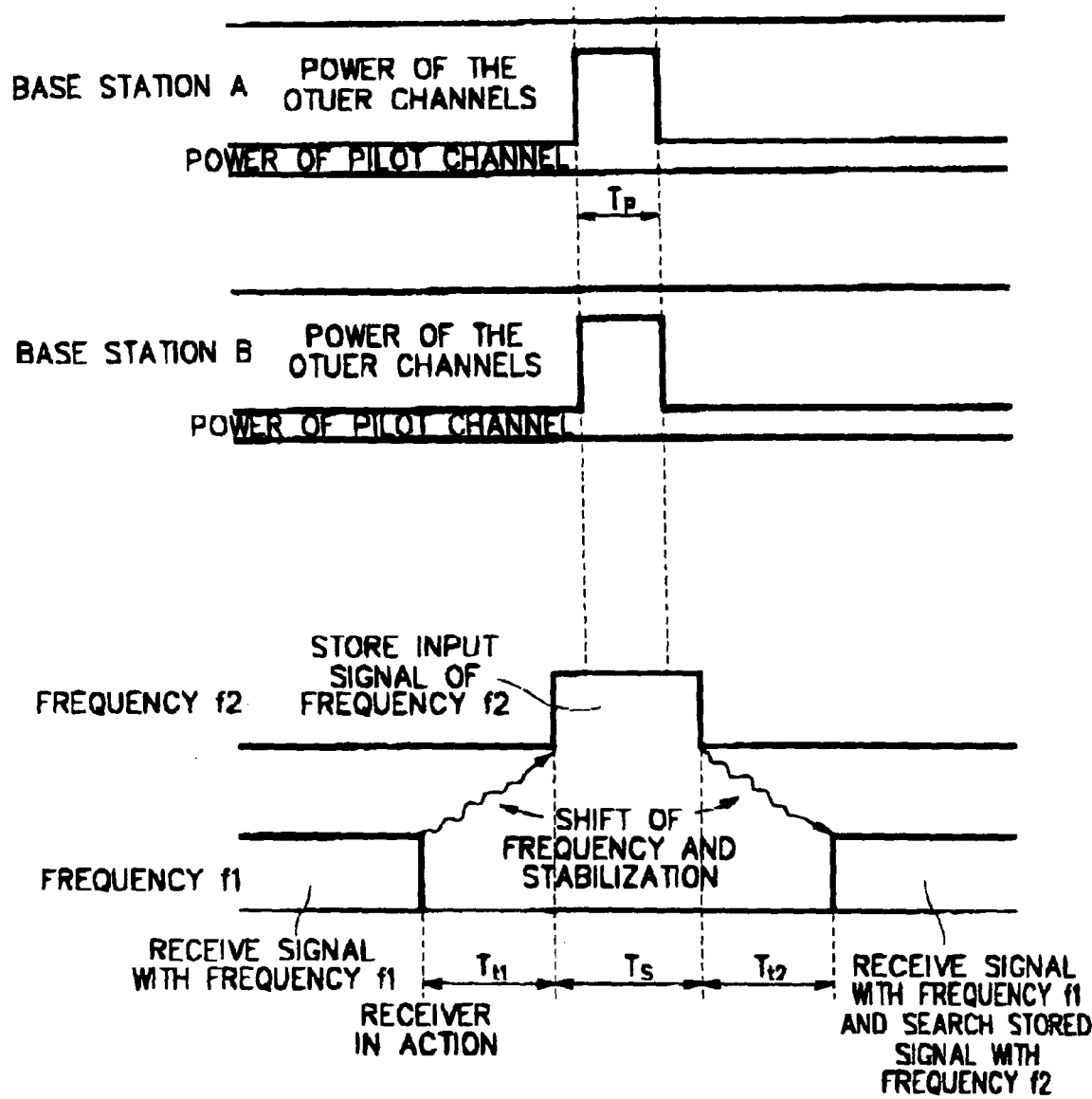
FIG. 18 illustrates a mobile operation for searching adjacent frequencies.

When a terminal searches for an adjacent frequency for a hard handoff between frequencies in IMT-2000 standards, the terminal temporarily stops receiving a signal with a frequency f1, shifts to an intended adjacent frequency f2, and stores an input signal of the frequency f in a memory. Then, the terminal returns to the old frequency f1 and continues receiving the old signal. Here, the terminal needs a memory for storing the input with an adjacent frequency. If the time when the input of the adjacent frequency is stored in the memory is concurrent with Tp or Td, the required capacity of the memory for storing the input of the adjacent frequency can be reduced. Assuming that the influence of propagation delay is negligible and pilot signal power is −12 dB relative to the overall transmission power of a base station, the effect of storing 4000 chips in a conventional structure is the same that of storing 256 or 512 chips for Tp. FIG. 18 illustrates an embodiment to search for adjacent frequencies for a hard handoff between frequencies.

In the embodiment of FIG. 18, each base station increases the pilot signal power for Tp. The same effects can be obtained from the structures of FIGS. 9A and 9B. It is assumed here that each base station is synchronized by a GPS. A plurality of base stations temporarily increase pilot channel power for Tp. A terminal stores a signal generated for Tp in a memory. The terminal receives a input signal with the frequency f1 at ordinary times. If the terminal needs to receive a signal with the adjacent frequency f2, the receiver temporarily stops receiving the signal with the frequency and shifts to the adjacent frequency f2 for a short time Tt1. If the signal with the frequency f2 is stable, the terminal stores the input signal with the frequency f2 in the memory for Ts. Ts is concurrent with Tp. Then, the terminal returns to the frequency f1. It is assumed that time required for shifting to the frequency f1 and stabilizing it is Tt2. If the frequency f1 is stabilized, the terminal continues receiving the signal with the frequency f1 and searches for the adjacent frequency f2 from the signal stored in the memory. In the embodiment of the present invention, the search for the adjacent frequency f2 starts after Tt2 but it can start after Ts when storage is completed.

In accordance with the embodiment of FIG. 18, Tp is concurrent with the time period for which the signal with an adjacent frequency is stored in the memory for search for the adjacent frequency. Therefore, the required capacity of the memory and power consumption can be reduced.

In the above embodiments, a base station sends a signal with an increased ratio of pilot signal power to the overall transmission power of the base station for a predetermined period, so that a terminal can easily acquire the signal. In other embodiments, signal acquisition in a terminal can be facilitated by increasing the ratio of the power of a specific data channel to the transmission power in a base station.

In these embodiments, the power of a specific data channel Chi is increased for a predetermined period for efficient search in a terminal. The terminal despreads the received signal at the higher power level for a specified time period, detects signals from a plurality of base stations, and measures the signal level, delay, or delay relative to other paths of a multipath signal received from each base station.

Here, "specific data channel" refers to a forward common channel used to send additional information in the following embodiments of the present invention, and the power of the data channel is increased for a predetermined time, which should be preset based on a mutual agreement between a base station and a terminal.

Figure 19A:
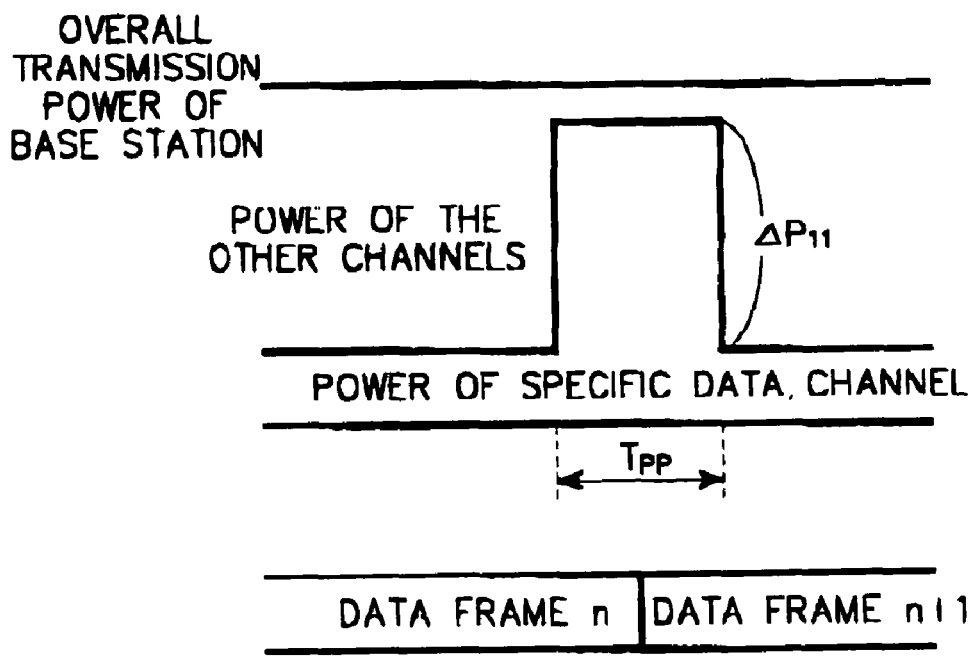
FIGS. 19A to 19D illustrate another embodiment of a forward link for enabling a terminal to acquire signals from a plurality of base stations by instantaneously increasing the power of a specific data channel.
Figure 19B:
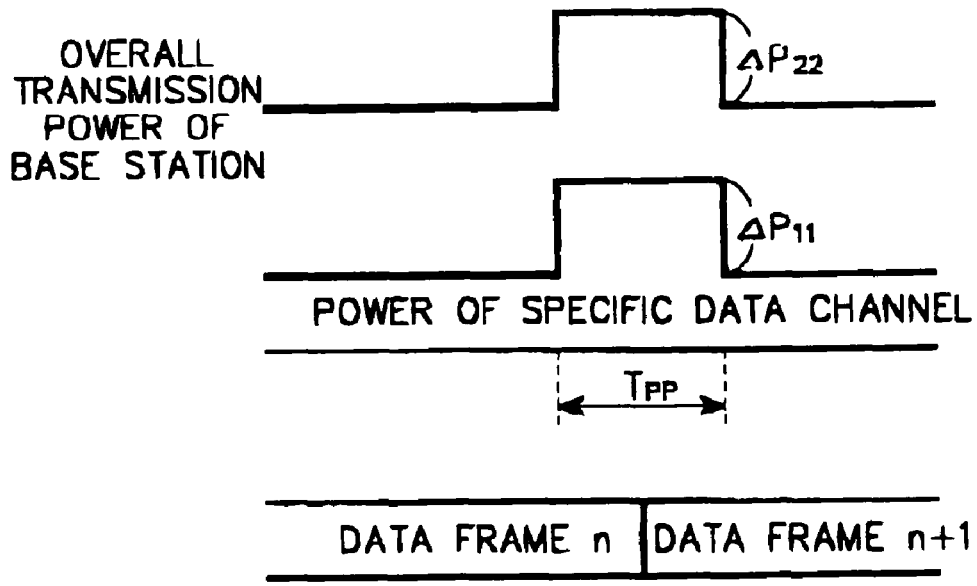

FIGS. 19A and 19B illustrate the structure of a forward link according to embodiments of the present invention. Here, a base station sends a specific data channel signal at an increased power level for a predetermined period Tpp so that a terminal can acquire signals from a plurality of base stations. In the embodiments, it is assumed that the specific data channel is a forward common channel used to send additional information. This channel may be a channel for sending non-encoded or non-interleaved information at the increased power level for Tpp. Information to be transmitted in this case could be an instruction that system set-up information should be updated because of the change of system set-up. The signal on the data channel with an increased power for Tpp can be sent only for Tpp. That is, for a search operation in the terminal, the signal with high power exists only for Tpp.

Referring to FIG. 19A, the base station increases the power of the data channel signal for the predetermined time period. In this embodiment, the overall transmission power of the base station is not changed. That is, signals on other channels are sent at a decreased transmission power level or are not sent, and the rest of the available power is assigned to a channel on which to send data symbols at a high power level. For more efficient set management, the entire transmission power of the base station may be assigned to the symbols on the data channel for Tpp. If there is a pilot channel, the transmission power except for the pilot signal power can be assigned to the data channel symbols.

The power level of the data channel at normal time (except Tpp) can be set to 0. That is, the data channel of this invention can be transmitted for Tpp time interval. The power level increment at Tpp time interval can be proportional to the power level of specific forward common channel. For example, the power level increment at Tpp interval can be proportional to the power level of forward common pilot channel, if the pilot channel exists.

FIG. 19A shows a case where signals on the other channels except for the data channel with an increased power for Tpp are sent with low power or not sent for the time period defined by Tpp. Also, Tpp is specified at the boundary between two data frames. This is intended to prevent performance degradation caused by transmission of other data channel signals at a lower power level than usual. In addition, Tpp is preferably located over two consecutive data frames, with Tpp/2 over each data frame, for uniform performance of the two data frames. The terminal which acquires synchronization should already know the value specified Tpp and its location with respect to the data frames.

Because Tpp is specified in the same way as Tp described referring to FIG. 4A, its detailed description will be omitted.

FIG. 19B shows another embodiment of increasing the power of a specific data channel signal for a time period Tpp. Here, data channel signals are sent for Tpp, the entire transmission power of the base station is increased by an amount ΔP22 for the duration of the transmission, Tpp. The data channel signal power is increased by ΔP11 for Tpp. Here, ΔP22 and ΔP11 may be equal or different. That is, this embodiment is characterized by the concurrent increase of the entire transmission power of the base station and the specific data channel signal power. As a result, the rates of the data channel signal power and the overall transmission power of the base station are temporarily increased from their ordinary levels. Assuming that a usual overall transmission power density of the base station is Ior and energy per chip of the data channel signal is Ec, $$\frac{\text{data channel } Ec + \Delta P_{11}}{Ior + \Delta P_{22}} > \frac{\text{data channel } Ec}{Ior} \quad (4)$$

Equation 4 illustrates the fact that the ratio of the data channel signal power to the overall transmission power of the base station is instantaneously higher than usual.

It should be noted that it is feasible for the power of the data channel to rise to the usual overall transmission power of the base station (i.e., usual overall transmission power +ΔP22). In this case, the base station transmits only the data channel signal and punctures the other channels.

The embodiment of FIG. 19B is the same as that of FIG. 19A in that Tpp is located at the data frame boundary, and the terminal should know the value of Tpp and its location. Tpp can be periodic or determined by the base station.

If there are a plurality of base stations around a terminal, the base stations are synchronized with respect to Tpp so that the base stations can increase the power of their respective signals on the specific data channels concurrently. It is further contemplated that the base stations can otherwise increase their powers of the signals on the specific data channels alternately. The time period Tpp when each base station increases its signal power for the specific data channel can be periodic or determined by the base station.

Figure 19C:
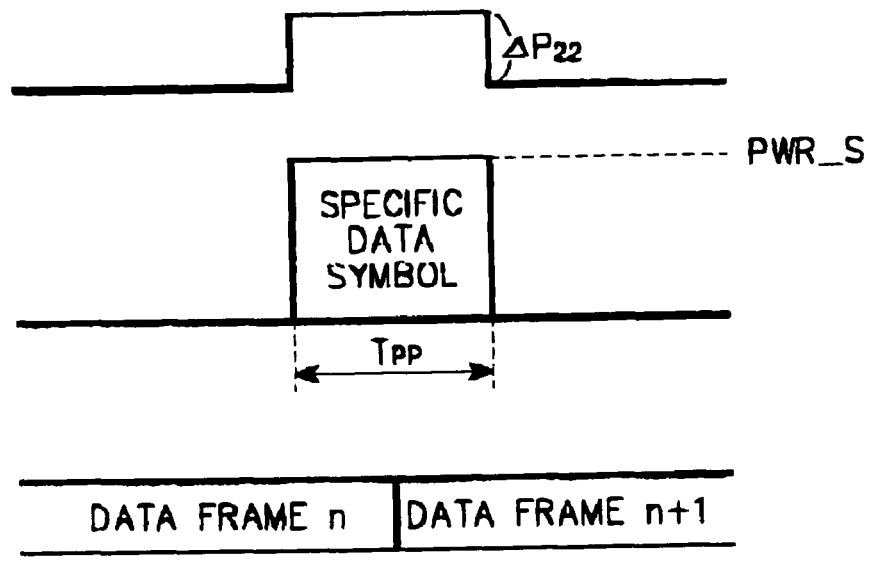

FIG. 19C shows a further embodiment of increasing the power of a specific data channel signal for the time period Tpp. Here, the signal on the specific data channel Chi is sent only for Tpp. Data symbols sent for Tpp may be non-encoded or non-interleaved ones. The overall transmission power of the base station is increased by ΔP22 for Tpp, and the data channel signal power is increased by PWR_S for Tpp. Here, ΔP22 and PWR_S may be equal or different. That is, this embodiment is characterized by the concurrent change of the entire transmission power of the base station and the specific data channel signal power. As a result, the rates of the data channel signal power and the overall transmission power of the base station are temporarily increased from their ordinary levels. Thus, the ratio of the data channel signal power to the overall transmission power. It should be noted that it is feasible for the power of the data channel to rise to the usual overall transmission power of the base station (i.e., usual overall transmission power +ΔP22). In this case, the base station transmits only the data channel signal and punctures the other channels.

The embodiment of FIG. 19C is the same as that of FIG. 19A in that Tpp is located at the data frame boundary, and the terminal should know the value of Tpp and its location. Tpp can be periodic or determined by the base station.

Figure 19D:
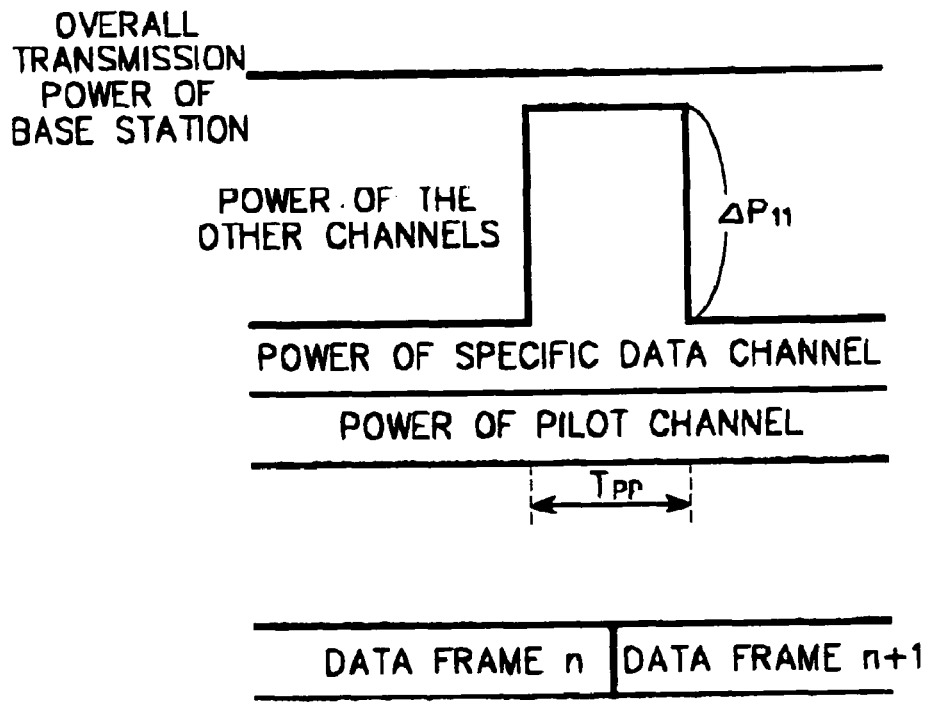

FIG. 19D shows a case where signals on the other channels except for the specific data channel with an increased power for Tpp and a pilot channel with a predetermined transmission power are sent with low power or not sent for the time period defined by Tpp. The power level of the data channel at normal time (except Tpp) can be set to 0. That is, the data channel of this invention can be transmitted for Tpp time interval.

If there are a plurality of base stations around a terminal, the base stations are synchronized with respect to Tpp so that the base stations can increase the power of their respective signals on the specific data channels concurrently. It is further contemplated that the base stations can otherwise increase their powers of the signals on the specific data channels alternately. The time period Tpp when each base station increases its signal power for the specific data channel can be periodic or determined by the base station.

Figure 20A:
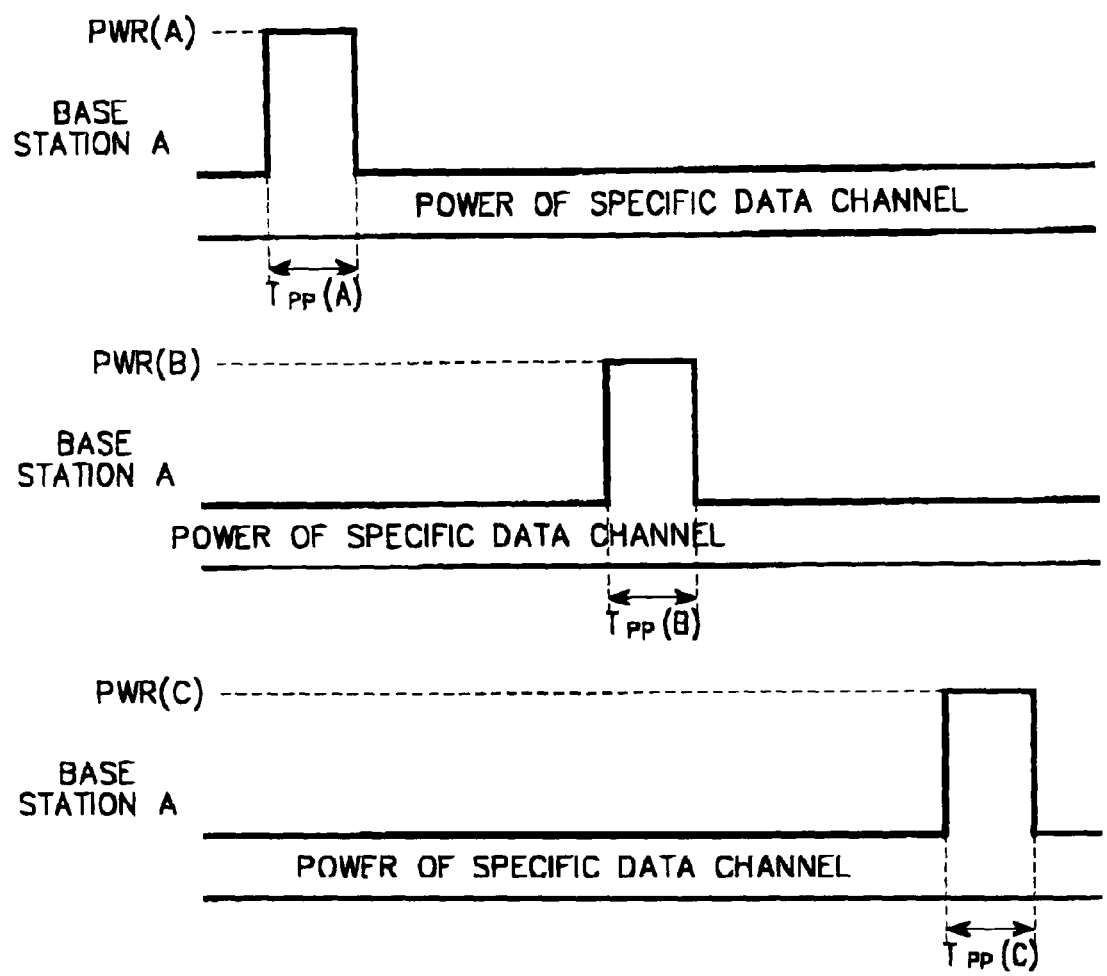
FIGS. 20A and 20B illustrate an embodiment of increasing the power of a specific data channel when there are a plurality of base stations.
Figure 20B:
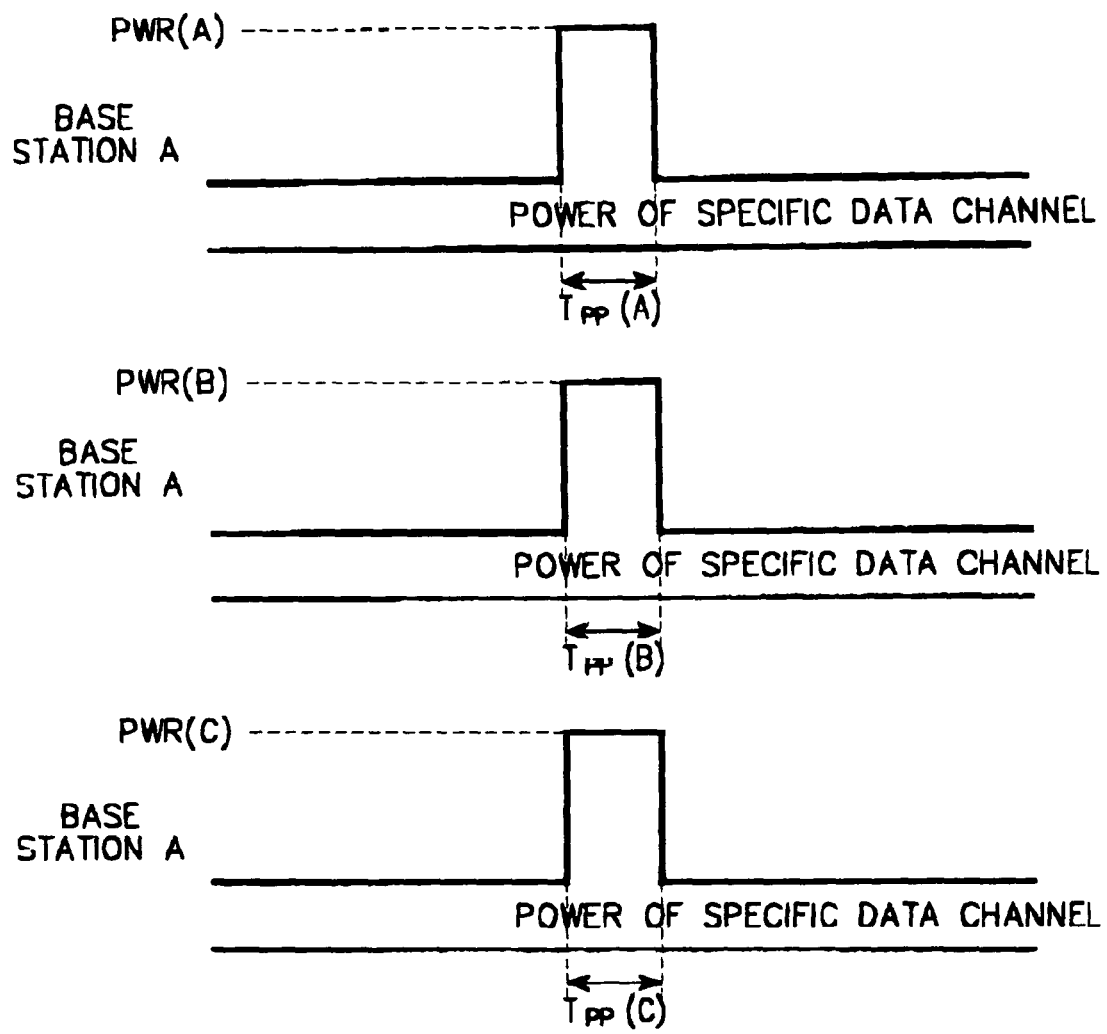

FIGS. 20A and 20B illustrate operations of base stations with a plurality of timings synchronized. In the drawings, only specific data channel signal power is shown. Here, the overall transmission power of a base station can be maintained at a usual level or increased by ΔP22 as shown in FIG. 19A. The significant thing is that the ratio of the specific data channel signal power to the overall transmission power of the base station is instantaneously higher than usual.

A detailed description of FIGS. 20A and 20B will be omitted since it is almost the same as that of FIGS. 5A and 5B. That is, if "pilot signal power" is replaced by "specific data channel signal power" and "Tp" by "Tpp", the description of FIGS. 5A and 5B can be used for FIGS. 20A and 20B.

Also, for a detailed description of the effects of increasing the power of the signal on the specific data channel, a description for FIG. 6 can be referred to.

Figure 21:
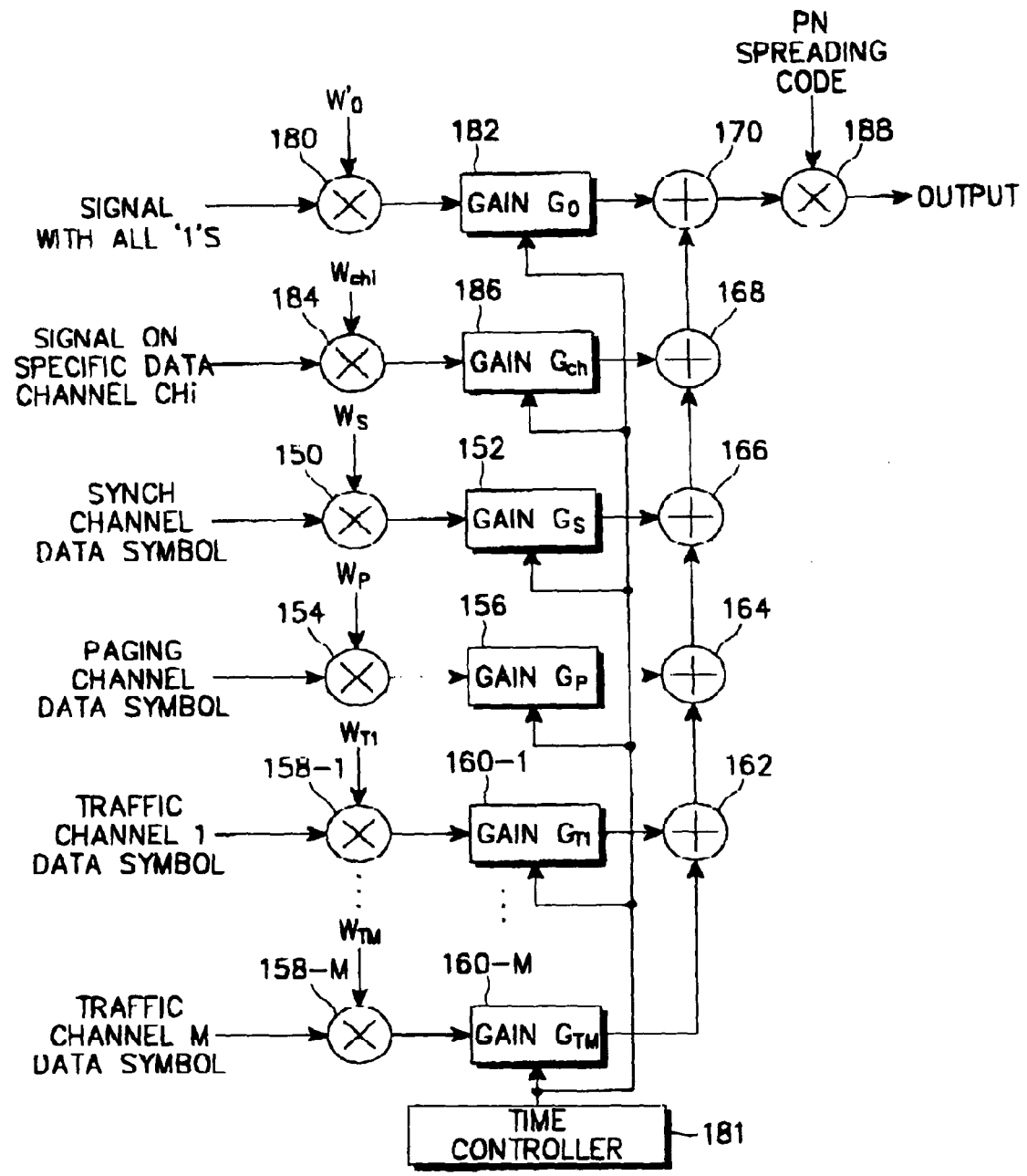
FIG. 21 is a block diagram of a transmitting device in a base station, for controlling the power of a specific data channel for a predetermined time period prior to transmission.

FIG. 21 is a block diagram of a transmitting device in a base station, for transmitting a signal on a specific data channel Chi at an instantaneously increased power level. The transmitting device includes a transmitter for the specific data channel, a pilot channel transmitter, a synch channel transmitter, a paging channel transmitter, and M traffic channel transmitters.

Referring to FIG. 21, a time controller 181 controls the gain of each channel for a predetermined time period Tpp so that the specific data channel signal is transmitted at a higher power level than usual. The powers of the other channels are changed within a range determined by the overall transmission power of the base station for a time period Tpp. It is to be appreciated that while the base station transmitting device for increasing the specific data channel power for a specified time has been described in connection with FIG. 21, the transmitting device is applicable to structures which will be later described by appropriately controlling the gain of each channel.

In operation, a pilot signal being all 1 s is spread by an orthogonal code W0' in a multiplier 180, and then multiplied by a gain G0 in a gain controller 182 whose operating time is controlled by the time controller 181. The output of the gain controller 182 is added to another channel signal in an adder 170 and multiplied by the same PN spreading code in a multiplier 188, for transmission.

The specific data channel signal for sending additional information is spread by an orthogonal code Wchi in a multiplier 184, and then multiplied by a gain Gch in a gain controller 186 whose operating time is controlled by the time controller 181. The output of the gain controller 186 is added to another channel signal in an adder 168 and multiplied by the same PN spreading code, for transmission. The signal on the specific data channel can be transmitted at a much higher transmission power level for Tpp, or sent only for Tpp. The specific data channel may be a forward common channel.

A synch channel data symbol signal is spread by an orthogonal code Ws in a multiplier 150 and multiplied by a gain Gs in a gain controller 152 whose operating time is controlled by the time controller 181. Then, the output of the gain controller 152 is added in an adder 166 and multiplied by the same PN spreading code in the multiplier 188, for transmission.

A paging channel data symbol signal is spread by an orthogonal code Wp in a multiplier 154 and multiplied by a gain Gp in a gain controller 156 whose operating time is controlled by the time controller 181. Then, the output of the gain controller 156 is added in an adder 164 and multiplied by the same PN spreading code in the multiplier 188, for transmission.

A traffic channel 1 data symbol signal is spread by an orthogonal code WT1 in a multiplier 158-1 and multiplied by a gain GT1 in a gain controller 160-1 whose operating time is controlled by the time controller 181. Then, the output of the gain controller 160-1 is added in an adder 162 and multiplied by the same PN spreading code in the multiplier 188, for transmission.

A traffic channel M data symbol signal is spread by an orthogonal code WTM in a multiplier 158-M and multiplied by a gain GTM in a gain controller 160-M whose operating time is controlled by the time controller 181. Then, the output of the gain controller 160-M is added in the adder 162 and multiplied by the same PN spreading code in the multiplier 188, for transmission.

A transmitting device for increasing the power of the specific data channel for a specified time period have been described with reference to FIG. 21. This scheme is commonly applicable to all structures according to the present invention as well as the embodiments of FIGS. 19A to 19D.

The challenging issue in acquiring signals from a plurality of base stations on a forward link by a terminal is that a terminal near to a base station cannot detect signals from other base station because the terminal receives a very strong signal from the nearby base station. That is, the signal of the nearby base station interferes with a signal from a remotely located base station, making it impossible for the terminal to detect the signal of the remote base station. To overcome this problem, the present invention decreases the overall transmission power of the nearby base station for a predetermined time Tdd and changes the power of a specific data channel, to thereby control the rates of the power of the specific data channel and the overall transmission power.

Figure 22:
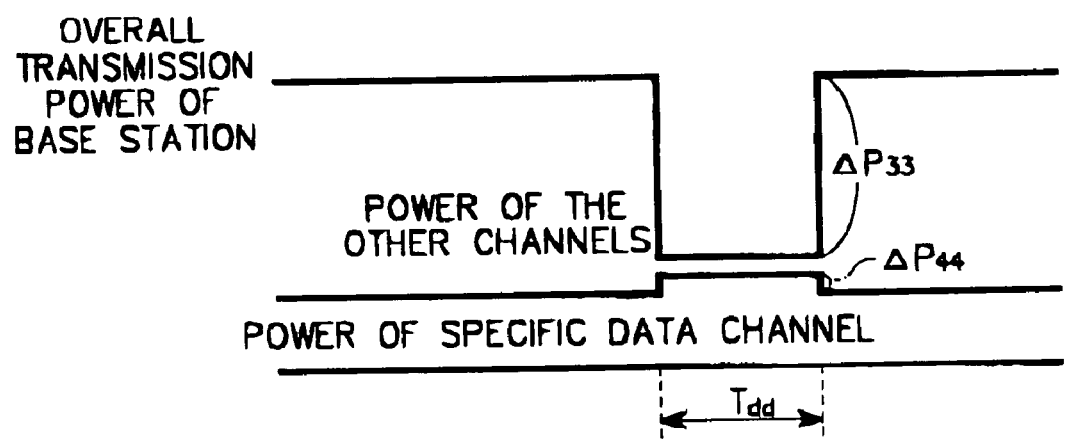
FIG. 22 illustrates an embodiment of dropping the overall transmission power of a base station, for a predetermined time period Td.

FIG. 22 illustrates an embodiment in which the overall transmission power of a base station is lowered for Tdd. A corresponding base station sends some channel signals at a lower power level than usual or does not send them, for Tdd. Tdd is preset by mutual agreement between the base station and a terminal. Tdd can be periodic or determined by the base station.

FIG. 22 illustrates the embodiment where the base station sends a base station signal at a lower than normal power level for a time period Tdd. Here, the decrement is ΔP33, and the transmission power of a specific channel signal may be changed. In FIG. 22, the decrement of the power of the specific data channel signal is ΔP44. Assuming that the overall transmission power density Ior and energy per chip of the specific data channel is Ec, $$\frac{\text{data channel } Ec + \Delta P_{44}}{Ior - \Delta P_{33}} > \frac{\text{data channel } Ec}{Ior} \quad (5)$$

It is noted from Eq. 5 that the ratio of the power of the specific data channel signal to the overall transmission power of the base station is temporarily higher than usual for a time period Tdd. In the embodiment of FIG. 22, the overall transmission power of the base station is reduced and the power of the specific data channel signal is changed within a range satisfying Eq. 5, so that the ratio of the power of the specific data channel signal to the overall transmission power of the base station is temporarily higher than usual. The embodiments of FIGS. 19A, 19B, and 19C aim at controlling the ratio of the power of the specific data channel signal to the overall transmission power by increasing the power of the specific data channel signal, while the embodiment of FIG. 22 focuses on controlling the ratio of the power of the specific data channel signal to the overall transmission power by lowering the overall transmission power. As shown in FIG. 22, the increase of the power of the specific data channel signal and the decrease of the overall transmission power can occur concurrently. Or the base station can send only the specific data channel signal for Tdd. If a pilot channel signal is transmitted all the time, the rest transmission power of the base station except for the power of the pilot channel signal can be assigned to the specific data channel signal.

Figure 23A:
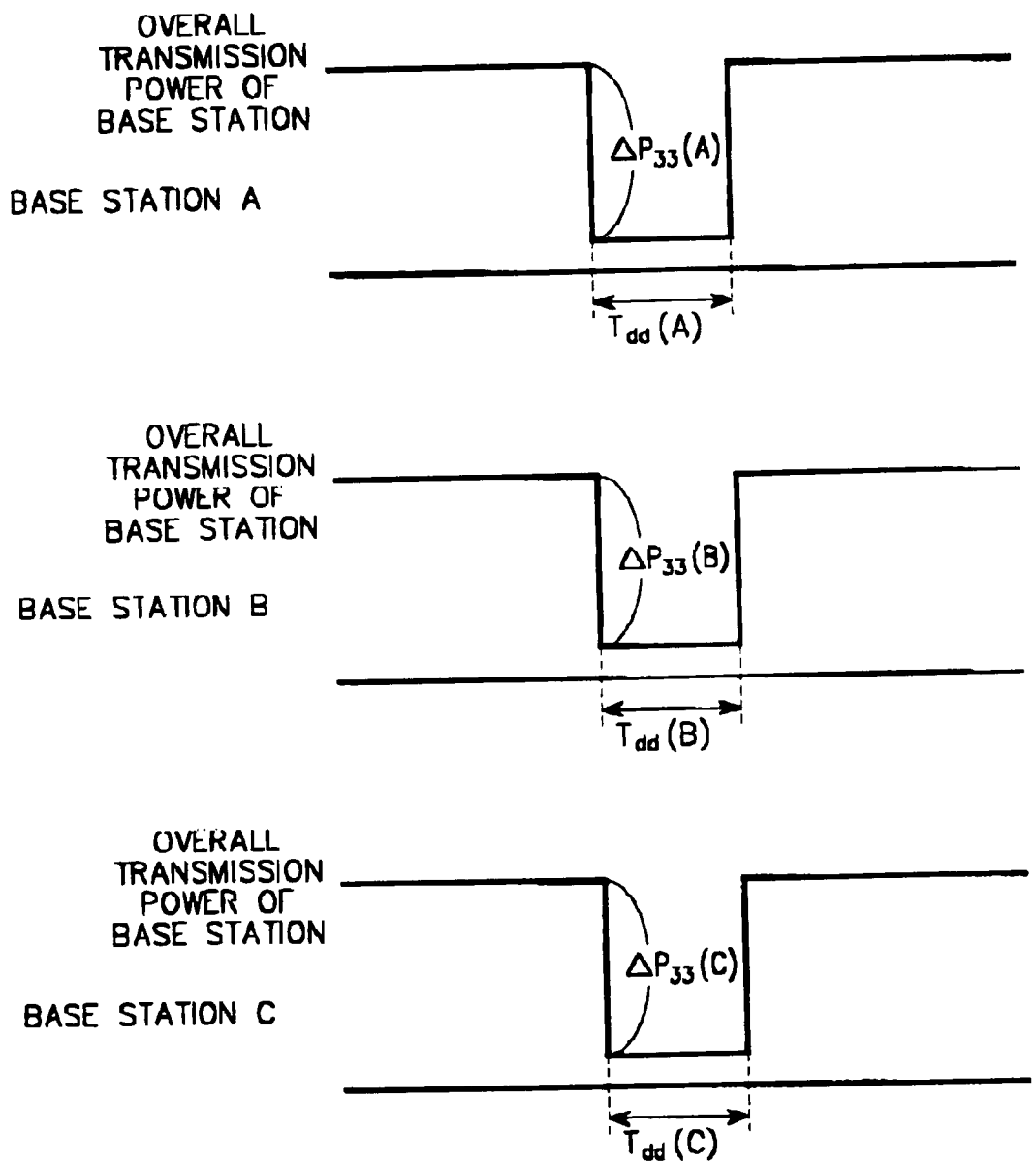
FIG. 23A illustrates another embodiment of simultaneously dropping the overall transmission power in a plurality of base stations.
Figure 23B:
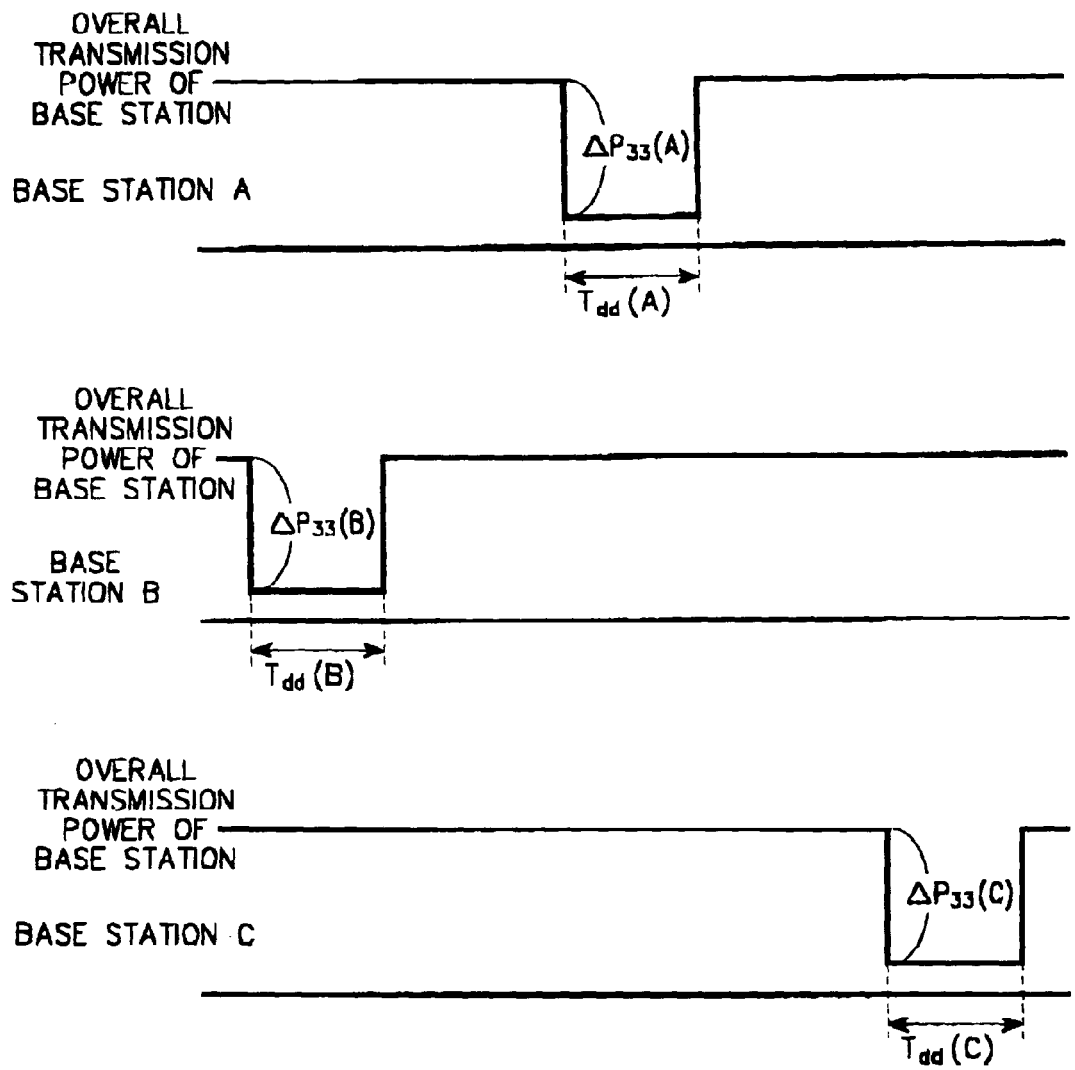
FIG. 23B illustrates a further embodiment of dropping the overall transmission power in a plurality of base stations by turns.

If there are a plurality of base stations in the vicinity of a terminal, Tdd is implemented by synchronization among the base stations. This is illustrated in FIGS. 23A and 23B. It is assumed here that each base station is synchronized to a GPS (Global Positioning System). Tdd can be periodic or determined by a base station.

FIGS. 23A and 23B illustrate the overall transmission power of a base station. In the embodiments depicted in FIGS. 23A and 23B, the specific data channel signal power satisfies Eq. 3. In addition, the power of the specific data channel signals of the plurality of base stations can be set to predetermined ratios to their pilot signal powers in order to facilitate comparison between reception levels of the pilot signals from the base stations. The embodiments of FIGS. 23A and 23B are based on the assumption that the power of the specific data channel signal is not changed for a time period Tdd.

A detailed description of FIGS. 23A and 23B will be omitted since it is almost the same as that of FIGS. 10A and 10B. That is, if "pilot signal power" is replaced by "specific data channel signal power" and "Td" by "Tdd", the description of FIGS. 10A and 10B is applicable to the embodiments depicted referring to FIGS. 23A and 23B.

As described above, the present invention enables a terminal to easily acquire signals from a plurality of base stations by changing the power of a specific data channel signal sent from a particular base station or by changing the overall transmission power of the base station for a predetermined time Tpp or Tdd and thus increasing the ratio of the power of the specific data channel signal to the overall transmission power from a normal value. Alternatively, a terminal near to a base station can easily acquire signals from other base stations by temporarily stopping transmission of signals from the nearby base station. Increasing the specific data channel signal power and decreasing the overall transmission power in combination lead to more benefits. The combination will be described later in detail with reference to FIGS. 24A and 24B.

Figure 24A:
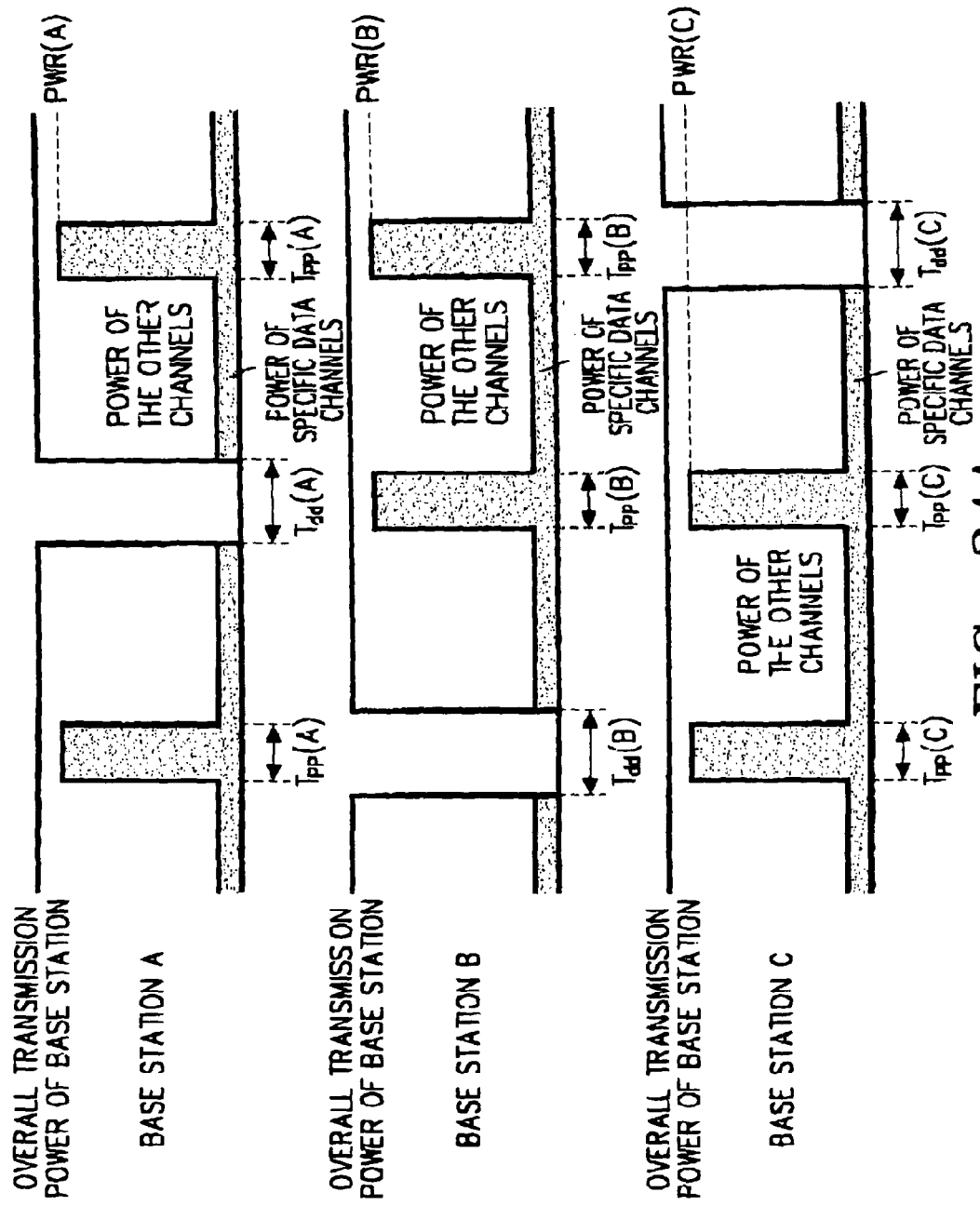
FIGS. 24A and 24B illustrates still another embodiment where both the increase of the data channel power and the decrease of the overall transmission power concurrently occur.
Figure 24B:
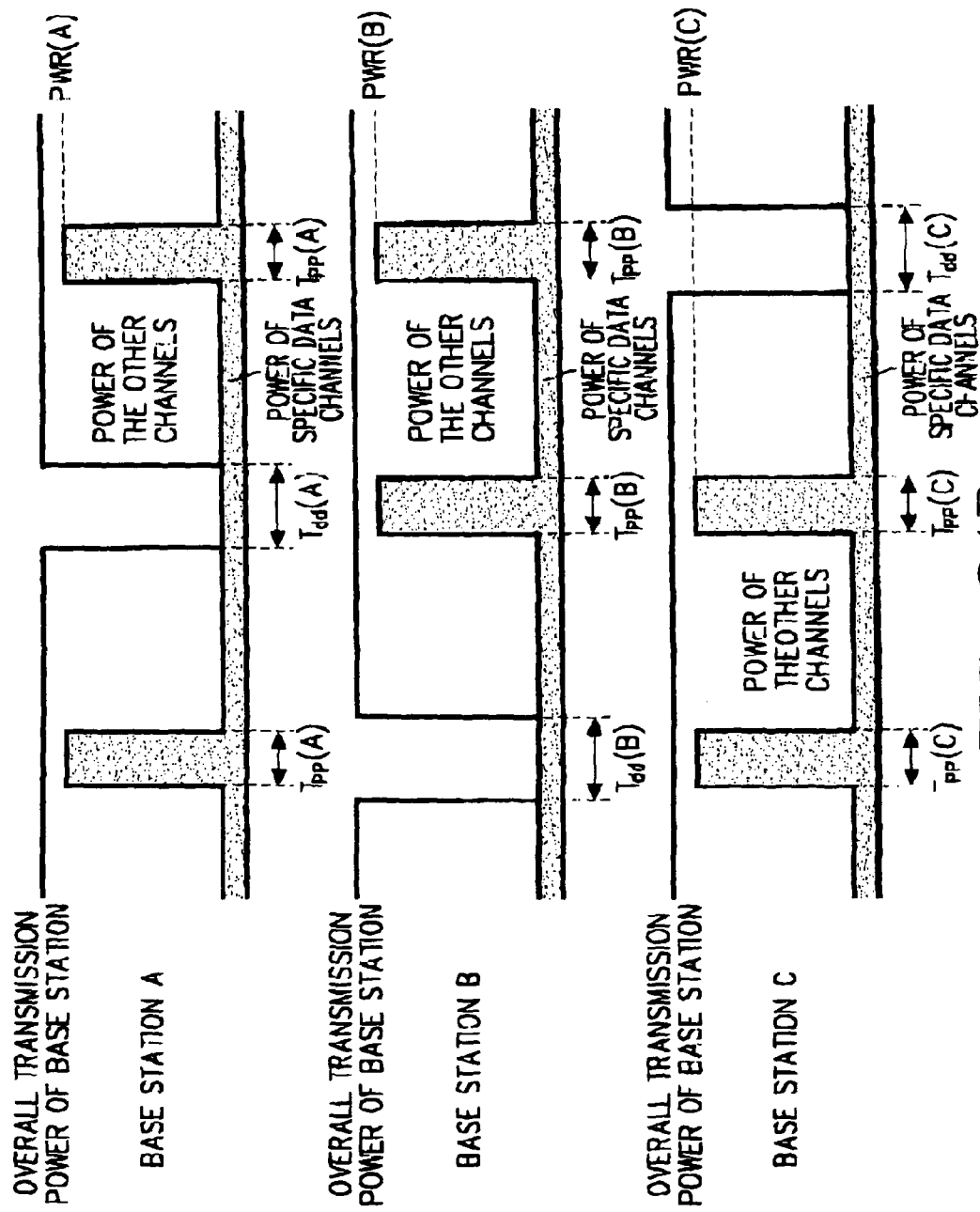

A detailed description of FIGS. 24A and 24B will be omitted since it is almost the same as that of FIGS. 11A and 11B. That is, if "pilot signal power" is replaced by "specific data channel signal power", "Tp" by "Tpp", and "Td" by "Tdd", the description of FIGS. 11A and 11B is applicable to the embodiments depicted referring to FIGS. 24A and 24B.

As described above, the present invention enables a terminal to easily acquire signals from a plurality of base stations by changing the power of a specific data channel signal sent from a base station or the overall transmission power of the base station for the predetermined time Tpp or Tdd, or by combining the two schemes, and thus increasing the ratio of the specific data channel chip energy Ec to a mobile reception power density Io for a specified time.

In various schemes according to the embodiments of the present invention, a terminal detects signals from a plurality of base stations by despreading signals received for Tpp or Tdd and measures the levels, propagation delays, or relative propagation delays in a multipath, of the received signals. Here, the terminal can detect a signal from each base station by depsreading a signal on a specific data channel. If a pilot signal is sent concurrently with the specific data channel signal, the base station signal can be detected by combining the signal levels of the pilot channel and the specific data channel. A receiver in embodiments of the present invention is so configured as to detect a signal of each base station by despreading the specific data channel signal. Which parameter to measure in the terminal vary depending on an intended purpose. If the terminal aims at measuring the distance between the terminal and a base station to thereby estimate its location, the necessary principal parameter is propagation delay. If the purpose of the terminal is finger assignment or handoff, the principal parameters to be measured are propagation delay in a multipath and signal level. For example, for the purpose of location estimation, a terminal measures the distances between the base stations and the terminal using propagation delays among measured parameters and sends information about the distances to the base station in communication with the terminal. Therefore, the location of the terminal with respect to the base station in communication can be determined from the distance information. For finger assignment or set management for a handoff, the terminal will perform a set management for adjacent base stations using propagation delays and signal levels among the measured parameters.

The receiver according to the above embodiments of the present invention is the same in configuration and operation as that disclosed in FIGS. 12 and 13. Therefore, its detailed description will be omitted here.

Figure 25:
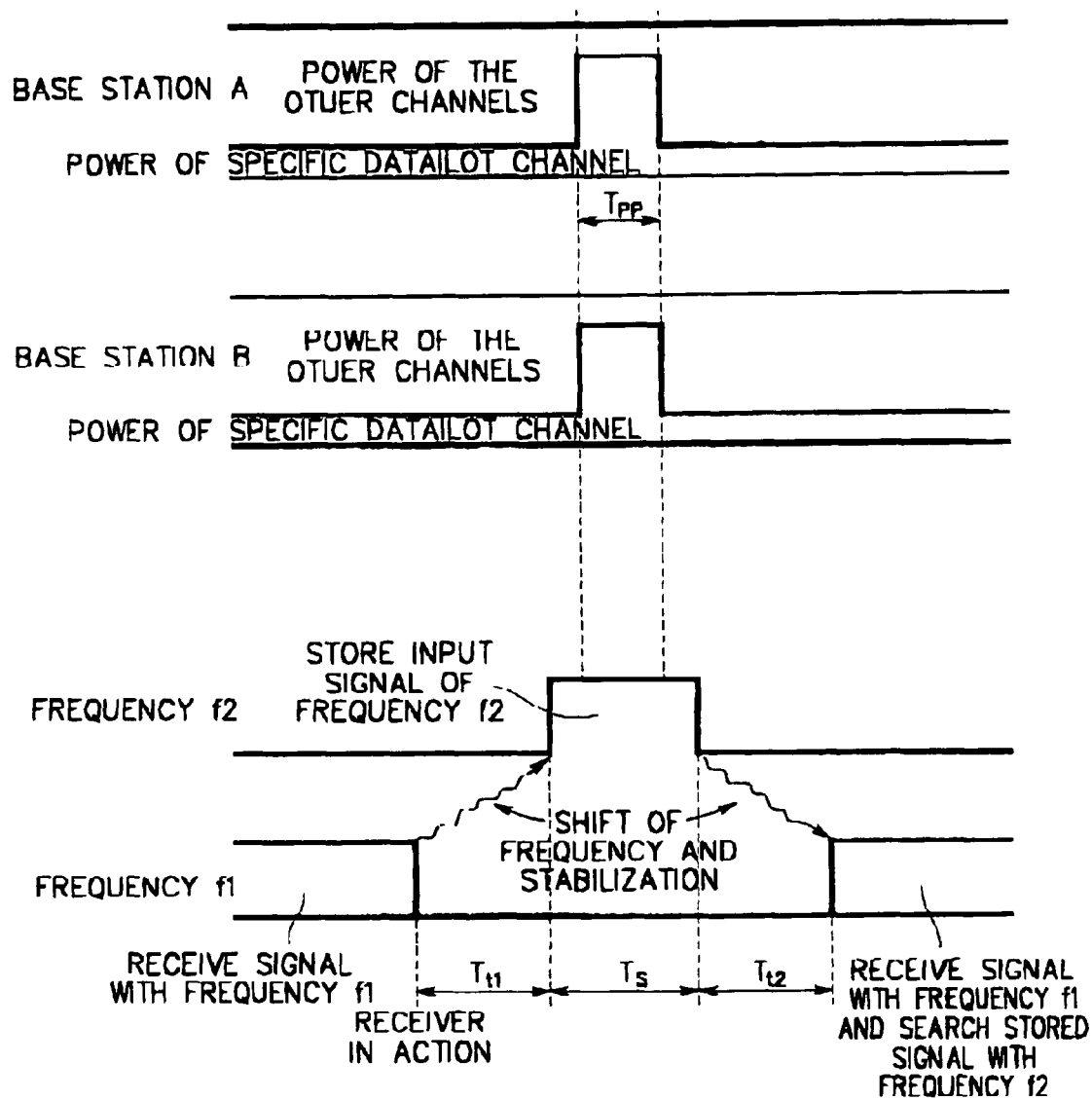
FIG. 25 illustrates a terminal operation for searching for an adjacent frequency according to the embodiments related with FIGS. 19 to 24B.

When a terminal searches for an adjacent frequency for a hard handoff between frequencies in IMT-2000 standards, the terminal temporarily stops receiving a signal with a frequency f1, shifts to an intended adjacent frequency f2, and stores an input signal of the frequency f2 in a memory. Then, the terminal returns to the old frequency f1 and continues receiving the old signal. Here, the terminal needs a memory for storing the input with an adjacent frequency. If the time when the input of the adjacent frequency is stored in the memory is concurrent with Tpp or Tdd, the required capacity of the memory for storing the input of the adjacent frequency can be reduced. Assuming that the influence of propagation delay is negligible and pilot signal power is −12 dB relative to the overall transmission power of a base station, the effect of storing 4000 chips in a conventional structure is the same that of storing 256 or 512 chips for Tp. FIG. 25 illustrates an embodiment to search for adjacent frequencies for a hard handoff between frequencies.

In the embodiment of FIG. 25, each base station increases the power of a specific data channel signal for Tpp. The same effects can be obtained from the structure of FIG. 22. It is assumed here that each base station is synchronized by a GPS. A plurality of base stations temporarily increase the power of the specific data channel signal for Tpp. A terminal stores a signal generated for Tpp in a memory. The terminal receives an input signal with the frequency f1 at ordinary times. If the terminal needs to receive a signal with the adjacent frequency f2, the receiver temporarily stops receiving the signal with the frequency and shifts to the adjacent frequency f2 for a short time Tt1. If the signal with the frequency f2 is stable, the terminal stores the input signal with the frequency f2 in the memory for Ts. Ts is concurrent with Tpp. Then, the terminal returns to the frequency f1. It is assumed that time required for shifting to the frequency f1 and stabilizing it is Tt2. If the frequency f1 is stabilized, the terminal continues receiving the signal with the frequency f1 and searches for the adjacent frequency f2 from the signal stored in the memory. In the embodiment of the present invention, the search for the adjacent frequency f2 starts after Tt2 but it can start after Ts when storage is completed.

In accordance with the embodiment of FIG. 25, Tpp is concurrent with the time period for which the signal with an adjacent frequency is stored in the memory for search for the adjacent frequency. Therefore, the required capacity of the memory and power consumption can be reduced.

According to the present invention as described above, a terminal can acquire signals from more adjacent base stations and efficiently manage sets in a CDMA communication system. In addition, the terminal can acquire signals from adjacent base stations with reduced power consumption and hardware complexity and accurately measure the power and time delay of a received signal. Detection of a multipath and an efficient finger assignment increases the performance of a rake receiver in a spread spectrum communication system. Furthermore, by storing an input signal in a memory for processing in a terminal, the capacity of the memory and power consumption can be decreased. The entire system capacity can be increased by reducing the usual level of pilot channel power and increasing the pilot channel power for a specified short time, and a location estimation service can be offered on a forward link.

While the present invention has been described in detail with reference to the specific embodiments, they are mere exemplary applications. Thus, it is to be clearly understood that many variations can be made by anyone skilled in the art within the scope and spirit of the present invention.

The invention claimed is:

1. A base station signal transmitting/receiving method comprising the steps of:
    setting a first signal on a common channel and a pilot signal on a pilot channel to a predetermined power level and a second signal on a dedicated channel to a different level according to the number of subscribers in a base station;
    increasing a ratio of the transmission power of the pilot signal to the overall transmission power of the base station for a predetermined time period in the base station; and
    acquiring at a terminal at least one base station signal transmitted for the predetermined time period.

2. The method of claim 1, wherein the base station increases the ratio of the transmission power of the pilot signal to the overall transmission power by increasing the transmission power of the pilot signal.

3. The method of claim 1, wherein the base station increases the ratio of the transmission power of the pilot signal to the overall transmission power by increasing the transmission power of the pilot signal and decreasing the transmission power of the data channel signal.

4. The method of claim 1, wherein the ratio of the transmission power of the pilot signal to the overall transmission power satisfies the inequality $$\frac{\text{pilot } Ec + \Delta P_1}{Ior + \Delta P_2} > \frac{\text{pilot } Ec}{Ior}$$

where Ior is the normal level of the overall transmission power density of the base station pilot Ec: energy per chip of the pilot signal on the pilot channel, ΔP1: power increment of the pilot signal on the pilot channel, and ΔP2: increment of the overall transmission power of the base station.

5. The method of claim 1, wherein the base station increases the ratio of the transmission power of the pilot signal to the overall transmission power by decreasing the transmission power of the data channel signal.

6. The method of claim 1, wherein the base station increases the ratio of the transmission power of the pilot signal to the overall transmission power by increasing the transmission power of the pilot signal and decreasing the transmission power of the other channel signals.

7. The method of claim 5, wherein the base station decreases the transmission power of the other channel signals to zero.

8. The method of claim 1, wherein the ratio of the transmission power of the pilot signal to the overall transmission power satisfies the inequality $$\frac{\text{pilot } Ec + \Delta P_4}{Ior - \Delta P_3} > \frac{\text{pilot } Ec}{Ior}$$

where Ior is the normal level of the overall transmission power density of the base station pilot Ec: energy per chip of the pilot signal on the pilot channel ΔP3: increment of the overall transmission power of the base station, and ΔP4: power increment of the pilot signal on the pilot channel.

9. The method of claim 1, wherein the predetermined time period is synchronized between at least two base stations.

10. The method of claim 9, wherein the predetermined time period is the same in the at least two base stations.

11. The method of claim 9, wherein the predetermined time period is different in the at least two base stations.

12. The method of claim 9, wherein the at least two base stations maintain the ratio of the transmission power of the pilot signal to the overall transmission power of the base station at the same value.

13. A mobile communication system comprising:
a base station transmitter for transmitting a pilot signal, a common channel signal, and a data channel signal, with a ratio of the transmission power of the pilot signal to the overall transmission power of a base station increased for a predetermined time period for signal transmission; and
a mobile station receiver for acquiring at least one base station signal transmitted from the predetermined time period.

14. The mobile communication system of claim 13, wherein the predetermined time period is located at the boundary of consecutive data frames of the second signal.

15. The mobile communication system of claim 13, wherein the ratio of the transmission power of the pilot signal to the overall transmission power satisfies the inequality $$\frac{\text{pilot } Ec + \Delta P_1}{Ior + \Delta P_2} > \frac{\text{pilot } Ec}{Ior}$$

where Ior is the normal level of the overall transmission power density of the base station pilot Ec: energy per chip of the pilot signal on the pilot channel ΔP1: power increment of the pilot signal on the pilot channel, and ΔP2: increment of the overall transmission power of the base station.

16. The mobile communication system of claim 13, wherein the ratio of the transmission power of the pilot signal to the overall transmission power satisfies the inequality $$\frac{\text{pilot } Ec + \Delta P_4}{Ior - \Delta P_3} > \frac{\text{pilot } Ec}{Ior}$$

where Ior is the normal level of the overall transmission power density of the base station pilot Ec: energy per chip of the pilot signal on the pilot channel, ΔP3: increment of the overall transmission power of the base station, and ΔP4: power increment of the pilot signal on the pilot channel.

17. The mobile communication system of claim 13, wherein the pilot signal sent for the predetermined time period is spread by a first spreading code, and the pilot signal sent for the other time period is spread by a second spreading code.

18. The mobile communication system of claim 13, wherein the pilot signal is spread by one spreading code.

19. The mobile communication system of claim 17, wherein the mobile station receiver acquires the at least one base station signal received for the predetermined time period by calculating a correlation value between the first and second spreading codes.

20. A signal transmitting/receiving method in a mobile communication system, comprising the steps of:
changing the ratio of the transmission power of a pilot signal to the overall transmission power of at least two base stations for a predetermined time period by the base stations; and
acquiring a base station signal for the predetermined time period by a terminal.

21. The method of claim 20, wherein a first base station changes the ratio of the transmission power of the pilot signal to the overall transmission power by decreasing the overall transmission power, and a second base station changes the ratio of the transmission power of the pilot signal to the overall transmission power by increasing the transmission power of the pilot signal.

22. A signal transmitting method in a base station, comprising the steps of:
sending a base station signal with a predetermined ratio of the transmission power of the pilot signal to the overall transmission power; and sending the base station signal with an increased ratio of the transmission power of the pilot signal to the overall transmission power for a predetermined time period.

23. A signal transmitting method in a base station, comprising the steps of:
transmitting a pilot signal at a predetermined power level; and
transmitting a predetermined signal of a common channel signal where the ratio of the transmission power of the predetermined signal to an overall transmission power of the base station is increased for a predetermined time period.

24. The method of claim 23, wherein the predetermined signal of the common channel signal includes additional information for transmission.

25. The method of claim 23, wherein the predetermined time period is located at the boundary of consecutive data frames.

26. The method of claim 25, wherein the predetermined time period occupies one-half of said consecutive data frames.

27. The method of claim 23, wherein the predetermined time period is set in consideration of propagation environment around the base station, arrangement of base stations, and a signal bandwidth.

28. The method of claim 25, wherein the predetermined time period represents a fraction of one data frame.

29. The method of claim 23, wherein the base station increases the ratio of the transmission power of the predetermined signal of the common channel signal to the overall transmission power by increasing the transmission power of the predetermined signal.

30. The method of claim 23, wherein the base station increases the ratio of the transmission power of the predetermined signal of the common channel signal to the overall transmission power by increasing the transmission power of the predetermined signal and the overall transmission power.

31. The method of claim 23, wherein the ratio of the transmission power of the predetermined signal to the overall transmission power satisfies the inequality $$\frac{\text{predetermined signal } Ec + \Delta P_{11}}{Ior + \Delta P_{22}} > \frac{\text{predetermined signal } Ec}{Ior}$$

where Ior is the normal level of the overall transmission power density of the base station,
predetermined signal Ec: energy per chip of the predetermined signal on a common channel,
$\Delta P_{11}$: power increment of the predetermined signal on a common channel, and
$\Delta P_{22}$: increment of the overall transmission power of the base station.

32. The method of claim 23, wherein the base station increases the ratio of the transmission power of the predetermined signal of the common channel signal to the overall transmission power by decreasing the overall transmission power of the base station.

33. The method of claim 23, wherein the base station increases the ratio of the transmission power of the predetermined signal of the common channel signal to the overall transmission power by increasing the transmission power of the predetermined signal of the common channel signal and decreasing the overall transmission power.

34. The method of claim 23, wherein the ratio of the transmission power of the predetermined signal of the common channel signal to the overall transmission power satisfies the inequality $$\frac{\text{predetermined signal } Ec + \Delta P_{44}}{Ior + \Delta P_{33}} > \frac{\text{predetermined signal } E}{Ior}$$

where
Ior: the normal level of the overall transmission power density of the base station,
predetermined signal Ec: energy per chip of the predetermined signal on a common channel,
$\Delta P_{33}$: increment of the overall transmission power of the base station, and
$\Delta P_{44}$: power increment of the predetermined signal on a common channel.

35. A signal transmitting method for transmitting common channel signals and data channel signals from a base station in a mobile communication system, comprising the steps of:
transmitting the data channel signals; and
changing the ratio of the transmission power of a predetermined common channel signal to the overall transmission power of the base station for a predetermined time period.

36. The method of claim 35, wherein the predetermined common channel signal includes additional information for transmission.

37. The method of claim 35, wherein the ratio of the transmission power of the predetermined signal to the overall transmission power satisfies the inequality $$\frac{\text{predetermined signal } Ec + \Delta P_{11}}{Ior + \Delta P_{22}} > \frac{\text{predetermined signal } Ec}{Ior}$$

where
Ior: the normal level of the overall transmission power density of the base station,
predetermined signal Ec: energy per chip of the predetermined signal on a common channel,
$\Delta P_{11}$: power increment of the predetermined signal on a common channel, and
$\Delta P_{22}$: increment of the overall transmission power of the base station.

38. The method of claim 35, wherein the ratio of the transmission power of the predetermined signal of the common channel signal to the overall transmission power satisfies the inequality $$\frac{\text{predetermined signal } Ec + \Delta P_{44}}{Ior + \Delta P_{33}} > \frac{\text{predetermined signal } Ec}{Ior}$$

where Ior is the normal level of the overall transmission power density of the base station,
predetermined signal Ec: energy per chip of the predetermined signal on a common channel,
$\Delta P_{33}$: increment of the overall transmission power of the base station, and
$\Delta P_{44}$: power increment of the predetermined signal on a common channel.

39. A base station signal transmitting/receiving method comprising the steps of:

transmitting a base station signal with a changed ratio of the transmission power of a predetermined common channel signal to the overall transmission power of a base station for a predetermined time period; and acquiring at a terminal at least one base station signal transmitted for the predetermined time period.

40. The method of claim 39, wherein the predetermined time period is synchronized between at least two base stations when there are at least two base stations in the vicinity of the terminal.

41. The method of claim 40, wherein the predetermined time period is different in the at least two base stations.

42. The method of claim 40, wherein the predetermined time period is the same in the at least two base stations.

43. The method of claim 40, wherein the at least two base stations maintain the ratio of the transmission power of the predetermined signal of the common channel signal to the overall transmission power of the base station at the same value.

44. The method of claim 40, wherein the predetermined signal of the common channel signal includes additional information for transmission.

45. The method of claim 39, wherein the ratio of the transmission power of the predetermined signal to the overall transmission power satisfies the inequality $$\frac{\text{predetermined signal } Ec + \Delta P_{11}}{Ior + \Delta P_{22}} > \frac{\text{predetermined signal } Ec}{Ior}$$

where
Ior: the normal level of the overall transmission power density of the base station,
predetermined signal Ec: energy per chip of the predetermined signal on a common channel,
$\Delta P_{11}$: power increment of the predetermined signal on a common channel, and
$\Delta P_{22}$: increment of the overall transmission power of the base station.

46. The method of claim 39, wherein the ratio of the transmission power of the predetermined signal of the common channel signal to the overall transmission power satisfies the inequality $$\frac{\text{predetermined signal } Ec + \Delta P_{44}}{Ior + \Delta P_{33}} > \frac{\text{predetermined signal } Ec}{Ior}$$

where
Ior: is the normal level of the overall transmission power density of the base station,
predetermined signal Ec: energy per chip of the predetermined signal on a common channel,
$\Delta P_{33}$: increment of the overall transmission power of the base station, and
$\Delta P_{44}$: power increment of the predetermined signal on a common channel.

47. A base station signal transmitting/receiving device comprising:
a base station transmitter for transmitting a signal with a changed ratio of the transmission power of a predetermined common channel signal to the overall transmission power of a base station for a predetermined time period; and
a mobile station receiver for acquiring at least one base station signal transmitted for the predetermined time period.

48. A base station signal transmitting/receiving device comprising:
a base station transmitter for transmitting a signal, the ratio of the transmission power of a predetermined common channel signal to the overall transmission power of a base station being changed for a predetermined time period and a pilot signal being at a predetermined power level for a predetermined time period; and
a mobile station receiver for acquiring at least one base station signal transmitted for the predetermined time period.

49. A base station signal transmitting method in a mobile communication system having a pilot signal and at least one data channel, comprising the steps of:
transmitting the pilot signal at a predetermined power level; and
increasing the transmission power of the pilot signal for a predetermined time period.

50. The method of claim 49, wherein the predetermined time period is located at the boundary between consecutive frames of the data channel.

51. The method of claim 49, wherein the transmission power of the pilot signal is periodically increased for the predetermined time period.

52. The method of claim 49, further comprising the step of notifying a mobile station of the predetermined time period by a base station.

53. The method of claim 49, wherein the transmission power of at least one of the other channel signals is decreased for the predetermined time period when the transmission power of the pilot signal is increased.

54. The method of claim 49, wherein transmission of at least one of the other channel signals is stopped for the predetermined time period when the transmission power of the pilot signal is increased.

55. The method of claim 9, wherein while one of the at least two base stations increases the transmission power of the pilot signal, the other base station decreases the overall transmission power.

56. The method of claim 20, wherein the ratio of the transmission power of a next pilot signal to be transmitted to the overall transmission power is changed by decreasing the overall transmission power in a third base station wherein said third base station is other than said first or second base station, and increasing the overall transmission power in these base stations other than said third base station.

57. The method of claim 23, wherein the predetermined common channel signal is transmitted only for a predetermined time period.

58. The method of claim 35, wherein the predetermined common channel signal is transmitted only for the predetermined time period.

59. The method of claim 39, wherein the predetermined signal is transmitted only for the predetermined time period.

* * * * *